United States Patent
Cha et al.

(10) Patent No.: US 12,207,216 B2
(45) Date of Patent: Jan. 21, 2025

(54) METHOD FOR TRANSMITTING AND RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Hyunsu Cha, Seoul (KR); Kijun Kim, Seoul (KR); Hyunsoo Ko, Seoul (KR); Haewook Park, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 17/798,626

(22) PCT Filed: Feb. 15, 2021

(86) PCT No.: PCT/KR2021/001888
§ 371 (c)(1),
(2) Date: Aug. 10, 2022

(87) PCT Pub. No.: WO2021/162514
PCT Pub. Date: Aug. 19, 2021

(65) Prior Publication Data
US 2023/0090914 A1 Mar. 23, 2023

Related U.S. Application Data

(60) Provisional application No. 62/976,389, filed on Feb. 14, 2020.

(51) Int. Cl.
*H04W 56/00* (2009.01)
*H04W 74/0833* (2024.01)

(52) U.S. Cl.
CPC ... *H04W 56/0045* (2013.01); *H04W 74/0833* (2013.01)

(58) Field of Classification Search
CPC ............... H04W 74/0833; H04W 56/0045
See application file for complete search history.

(56) References Cited

U.S. PATENT DOCUMENTS

2012/0289247 A1 11/2012 Siomina et al.
2023/0127817 A1* 4/2023 Lee ............ H04W 64/00
370/329

FOREIGN PATENT DOCUMENTS

WO 2017139014 A1 8/2017
WO 2020009510 A1 1/2020

OTHER PUBLICATIONS

R1-1912275: 3GPP TSG RAN WG1 #99 Reno, NV, USA, Nov. 18-22, 2019, LG Electronics, "Discussion on necessity and details for physical-layer procedures to support UE/gNB measurements," Aug. 17, 2017 (13 Pages).

(Continued)

*Primary Examiner* — Sulaiman Nooristany
(74) *Attorney, Agent, or Firm* — BRYAN CAVE LEIGHTON PAISNER LLP

(57) ABSTRACT

Various embodiments relate to a next generation wireless communication system for supporting a data transmission rate higher than that of a 4$^{th}$ generation (4G) wireless communication system. According to various embodiments, a method for transmitting and receiving a signal in a wireless communication system, and a device for supporting same can be provided, and other various embodiments can be provided.

12 Claims, 31 Drawing Sheets

An illustrative example of UE RX-RX time difference measurement and gNB RX-TX time difference measurement for two-step RACH process

(56) References Cited

OTHER PUBLICATIONS

R1-1913137: 3GPP TSG RAN WG1 #99, Reno, NV, USA, Oct. 18-22, 2019, Ericsson, "UE and gNB measurements for NR positioning," Nov. 8, 2019 (23 Pages).

* cited by examiner (a)

| NRPPa | HTTP/2 | TLS | IP | L2 | L1 | LMF |
|---|---|---|---|---|---|---|
|  |  | TCP |  |  |  |  |

NLs

| HTTP/2 | TLS | IP | L2 | L1 | AMF |
|---|---|---|---|---|---|
|  | TCP |  |  |  |  |

| NGAP | SCTP | IP | L2 | L1 | |

NG-C

| NRPPa | NGAP | SCTP | IP | L2 | L1 | NG RAN |

(a)

(b)

Starting from gNB. An illlustrative example of UE RX-RX time difference measurement and gNB RX-TX time difference An illustrative example of UE RX-RX time difference measurement and gNB RX-TX time difference measurement for two-step RACH process An illustrative example of UE RX-RX time difference measurement
and gNB RX-TX time difference measurement for four-step RACH process Starting from UE. An inllustrative example of UE RX-RX time difference measurement and gNB RX-TX time difference

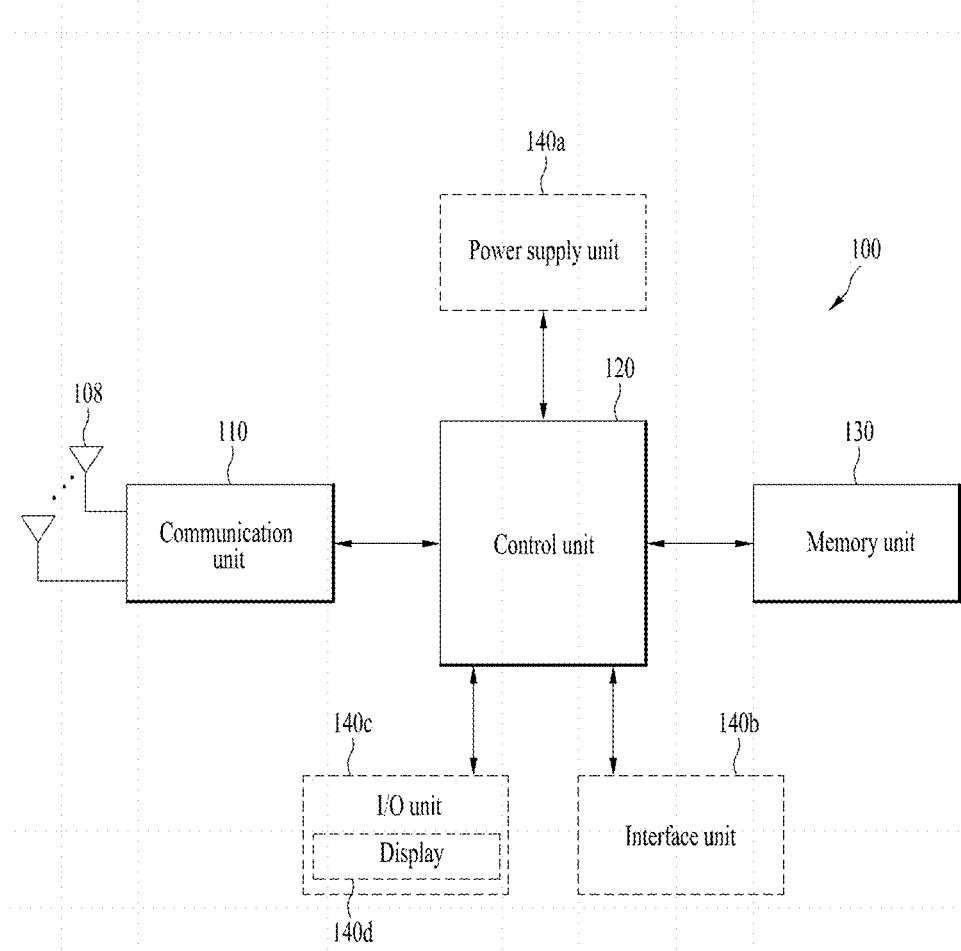

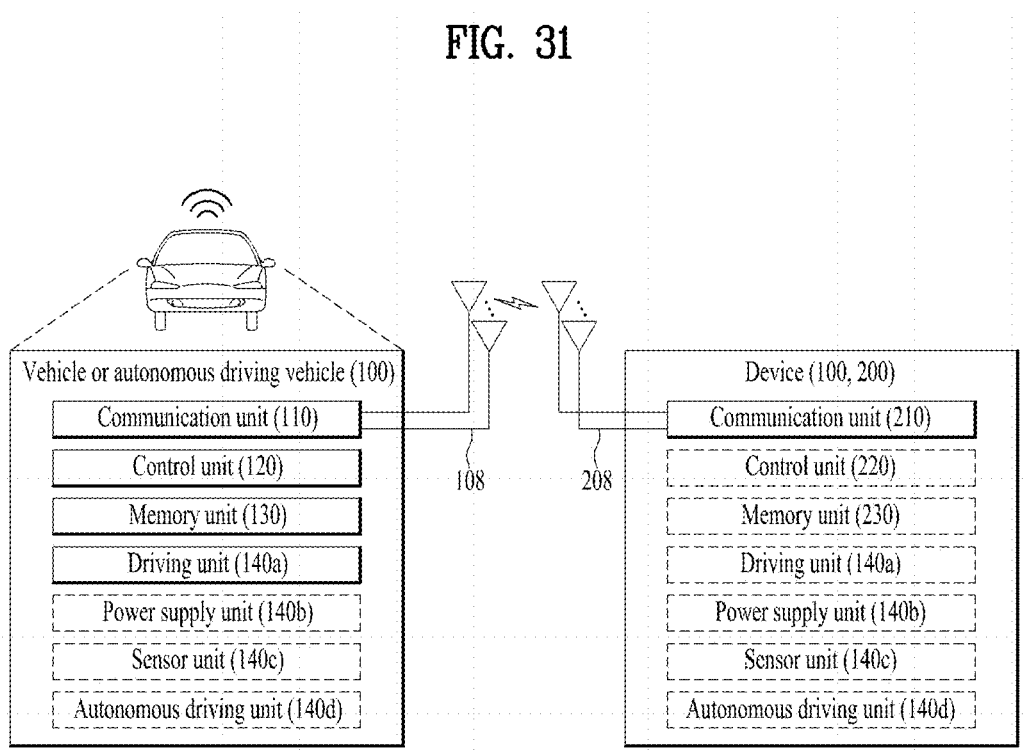

METHOD FOR TRANSMITTING AND RECEIVING SIGNAL IN WIRELESS COMMUNICATION SYSTEM, AND APPARATUS FOR SUPPORTING SAME

This application is the National Stage filing under 35 U.S.C. 371 of International Application No. PCT/KR2021/001888 filed on Feb. 15, 2021, which claims priority to U.S. Provisional Application No. 62/976,389 filed on Feb. 14, 2020, the contents of which are all hereby incorporated by reference herein in their entirety.

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a method for determining a TA based on an RTT in a wireless communication system, and an apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method for transmitting and receiving a signal in a wireless communication system and an apparatus supporting the same.

According to various embodiments, a method performed by an apparatus in a wireless communication system may be provided.

According to various embodiments, the method may include receiving a synchronization signal block (SSB) from a base station; performing a random access procedure; and acquiring information related to timing advance (TA).

According to various embodiments, the random access procedure may include transmitting a first message including a physical random access channel (PRACH) preamble based on the SSB; and receiving a second message including information related to a random access response (RAR) after transmitting the first message.

According to various embodiments, the TA may be acquired based on a sum of (i) a difference between a reception time of the SSB at the apparatus and a transmission time of the first message at the apparatus, and (ii) a difference between a transmission time of the SSB at the base station and a reception time of the first message at the base station.

According to various embodiments, the method may further include receiving information for configuring the TA to be acquired based on the sum of (i) the difference between the reception time of the SSB at the apparatus and the transmission time of the first message at the apparatus, and (ii) the difference between the transmission time of the SSB at the base station and the reception time of the first message at the base station.

According to various embodiments, the second message may further include information related to the difference between the transmission time of the SSB at the base station and the reception time of the first message at the base station.

According to various embodiments, the second message may further include information related to a timing offset.

According to various embodiments, the timing offset may be related to a downlink (DL) uplink (UL) switching time of the base station.

According to various embodiments, the TA may be acquired based on the timing offset being applied to the sum of (i) the difference between the reception time of the SSB at the apparatus and the transmission time of the first message at the apparatus, and (ii) the difference between the transmission time of the SSB at the base station and the reception time of the first message at the base station.

According to various embodiments, the method may further include reporting the TA based on receiving information for configuring the TA to be reported.

According to various embodiments, the apparatus may include a plurality of antenna elements.

According to various embodiments, the method may further include, based on receiving information for configuring a measurement related to one or more antenna elements among the plurality of antenna elements to be reported, reporting information relating to a difference between a reception time of a downlink (DL) reference signal (RS) related to the one or more antenna elements at the apparatus and the transmission time of the first message at the apparatus.

According to various embodiments, the DL RS may include one or more of the SSB, a positioning reference signal (PRS), or a channel state information reference signal (CSI-RS).

According to various embodiments, the random access procedure may further include transmitting a third message including a physical uplink shared channel (PUSCH) based on scheduling information included in the RAR, wherein the TA may be acquired based on a sum of (i) a difference between a reception time of the second message at the apparatus and a transmission time of the third message at the apparatus, and (ii) a difference between a transmission time of the second message at the base station and a reception time of the third message at the base station.

According to various embodiments, an apparatus operating in a wireless communication system may be provided.

According to various embodiments, the apparatus may include a memory and one or more processors connected to the memory.

According to various embodiments, the one or more processors may be configured to receive a synchronization signal block (SSB) from a base station; perform a random access procedure; and acquire information related to timing advance (TA).

According to various embodiments, the random access procedure may include transmitting a first message including a physical random access channel (PRACH) preamble based on the SSB; and receiving a second message including information related to a random access response (RAR) after transmitting the first message.

According to various embodiments, the TA may be acquired based on a sum of (i) a difference between a reception time of the SSB at the apparatus and a transmission time of the first message at the apparatus and (ii) a difference between a transmission time of the SSB at the base station and a reception time of the first message at the base station.

According to various embodiments, the one or more processors may be configured to receive information for configuring the TA to be acquired based on the sum of (i) the difference between the reception time of the SSB at the apparatus and the transmission time of the first message at the apparatus, and (ii) the difference between the transmission time of the SSB at the base station and the reception time of the first message at the base station.

According to various embodiments, the second message may further include information related to the difference between the transmission time of the SSB at the base station and the reception time of the first message at the base station.

According to various embodiments, the apparatus may be configured to communicate with one or more of a mobile terminal, a network, and an autonomous vehicle other than a vehicle containing the apparatus.

According to various embodiments, a method performed by an apparatus in a wireless communication system may be provided.

According to various embodiments, the method may include transmitting a synchronization signal block (SSB); performing a random access procedure; and acquiring information related to timing advance (TA).

According to various embodiments, the random access procedure may include transmitting the SSB and receiving a first message including a physical random access channel (PRACH) preamble from a terminal; and transmitting a second message including information related to a random access response (RAR) to the terminal after receiving the first message, According to various embodiments, the TA may be acquired based on a sum of (i) a difference between a reception time of the SSB at the terminal and a transmission time of the first message at the terminal and (ii) a difference between a transmission time of the SSB at the apparatus and a reception time of the first message at the apparatus.

According to various embodiments, an apparatus operating in a wireless communication system may be provided.

According to various embodiments, the apparatus may include a memory and one or more processors connected to the memory.

According to various embodiments, the one or more processors may be configured to transmit a synchronization signal block (SSB); perform a random access procedure; and acquire information related to timing advance (TA).

According to various embodiments, the random access procedure may include transmitting the SSB and receiving a first message including a physical random access channel (PRACH) preamble from a terminal; and transmitting a second message including information related to a random access response (RAR) to the terminal after receiving the first message.

According to various embodiments, the TA may be acquired based on a sum of (i) a difference between a reception time of the SSB at the terminal and a transmission time of the first message at the terminal; and (ii) a difference between a transmission time of the SSB at the apparatus and a reception time of the first message at the apparatus.

According to various embodiments, an apparatus operating in a wireless communication system may be provided.

According to various embodiments, the apparatus may include one or more processors and one or more memories storing one or more instructions to cause the one or more processors to carry out a method.

According to various embodiments, the method may include receiving a synchronization signal block (SSB) from a base station; performing a random access procedure; and acquiring information related to timing advance (TA).

According to various embodiments, the random access procedure may include transmitting a first message including a physical random access channel (PRACH) preamble based on the SSB; and receiving a second message including information related to a random access response (RAR) after transmitting the first message.

According to various embodiments, the TA may be acquired based on a sum of (i) a difference between a reception time of the SSB at the apparatus and a transmission time of the first message at the apparatus and (ii) a difference between a transmission time of the SSB at the base station and a reception time of the first message at the base station.

According to various embodiments, a processor-readable medium storing one or more instructions to cause one or more processors to carry out a method may be provided.

According to various embodiments, the method may include receiving a synchronization signal block (SSB) from a base station; performing a random access procedure; and acquiring information related to timing advance (TA).

According to various embodiments, the random access procedure may include transmitting a first message including a physical random access channel (PRACH) preamble based on the SSB; and receiving a second message including information related to a random access response (RAR) after transmitting the first message, According to various embodiments, the TA may be acquired based on a sum of (i) a difference between a reception time of the SSB at the apparatus and a transmission time of the first message at the apparatus and (ii) a difference between a transmission time of the SSB at the base station and a reception time of the first message at the base station.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

Advantageous Effects

According to various embodiments, a signal may be effectively transmitted and received in a wireless communication system.

According to various embodiments, since the TA is acquired based on the RTT rather than a unidirectional signal, the TA accuracy may be improved.

According to various embodiments, positioning accuracy may be improved in a wireless communication system.

According to various embodiments, positioning for an RRC connected/inactive/idle UE may be supported.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 13 is a diagram illustrating protocol layers for supporting NR positioning protocol a (NRPPa) protocol data unit (PDU) transmission, to which various embodiments are applicable.

FIG. 30 is a block diagram illustrating a portable device applied to various embodiments of the present disclosure;

FIG. 31 is a block diagram illustrating a vehicle or an autonomous driving vehicle, which is applied to various embodiments of the present disclosure; 【발명의 실시 위한 형태】

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
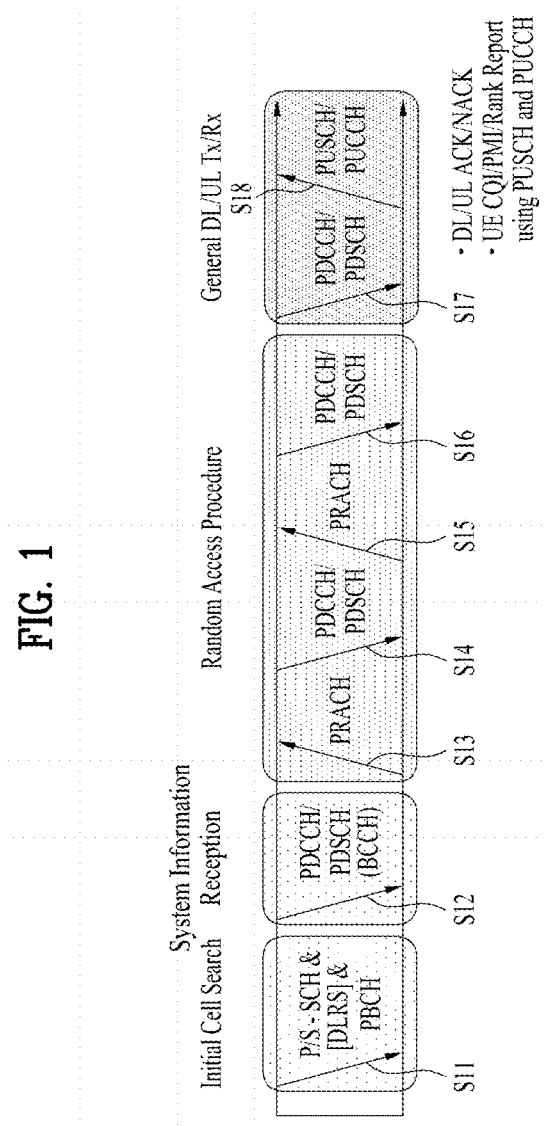
FIG. 1 is a diagram illustrating physical channels and a signal transmission method using the physical channels, which may be used in various embodiments of the present disclosure.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information).

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
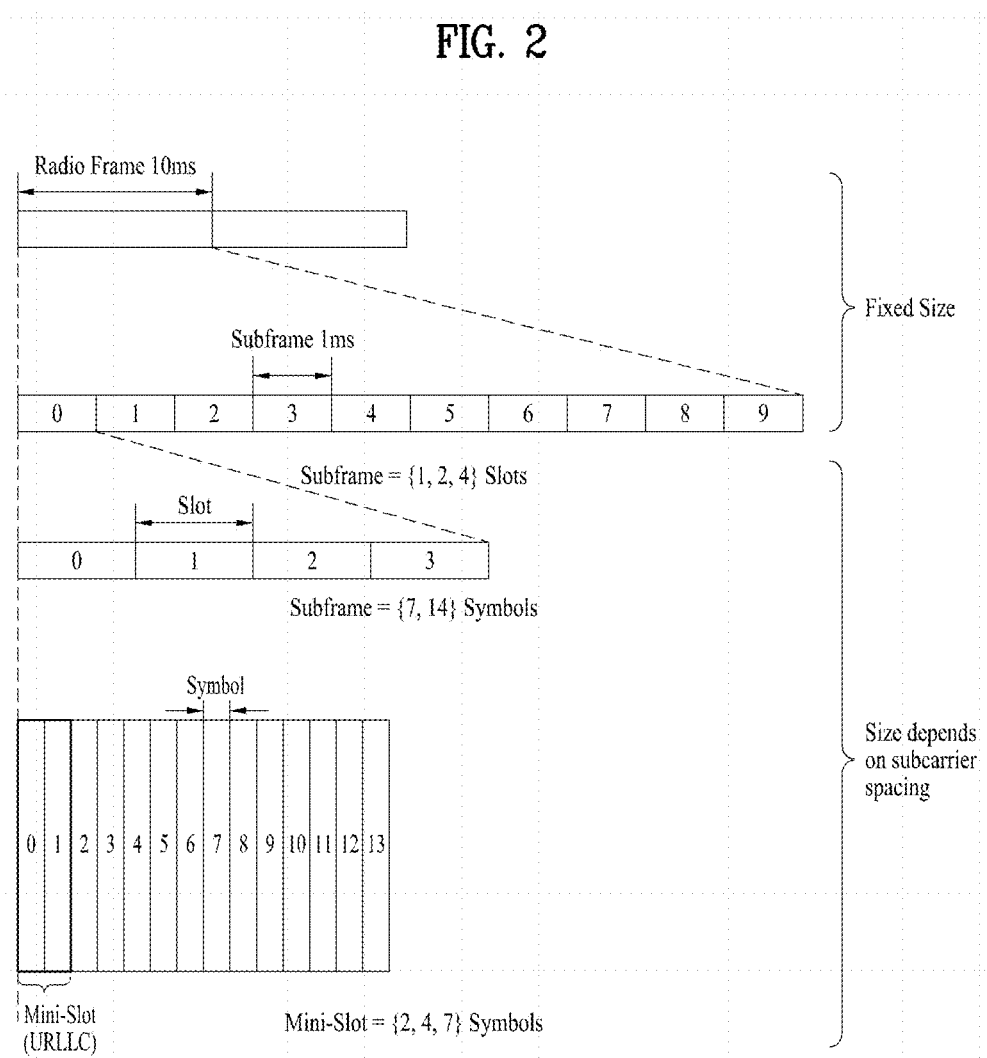
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or µ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), µ and a CP are obtained from RRC parameters provided by the BS.

TABLE 1

| µ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology $\mu$, slots are numbered with $n^{\mu}_s \in \{0, \ldots, N^{slot,\mu}_{subframe}-1\}$ in an increasing order in a subframe, and with $n^{\mu}_{s,f} \in \{0, \ldots, N^{slot,\mu}_{frame}-1\}$ in an increasing order in a radio frame. One slot includes $N^{\mu}_{symb}$ consecutive OFDM symbols, and $N^{\mu}_{symb}$ depends on a CP. The start of a slot $n^{\mu}_s$ in a subframe is aligned in time with the start of an OFDM symbol $n^{\mu}_s*N^{\mu}_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N^{slot}_{symb}$ | $N^{frame,\mu}_{slot}$ | $N^{subframe,\mu}_{slot}$ |
| --- | --- | --- | --- |
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

Figure 7:
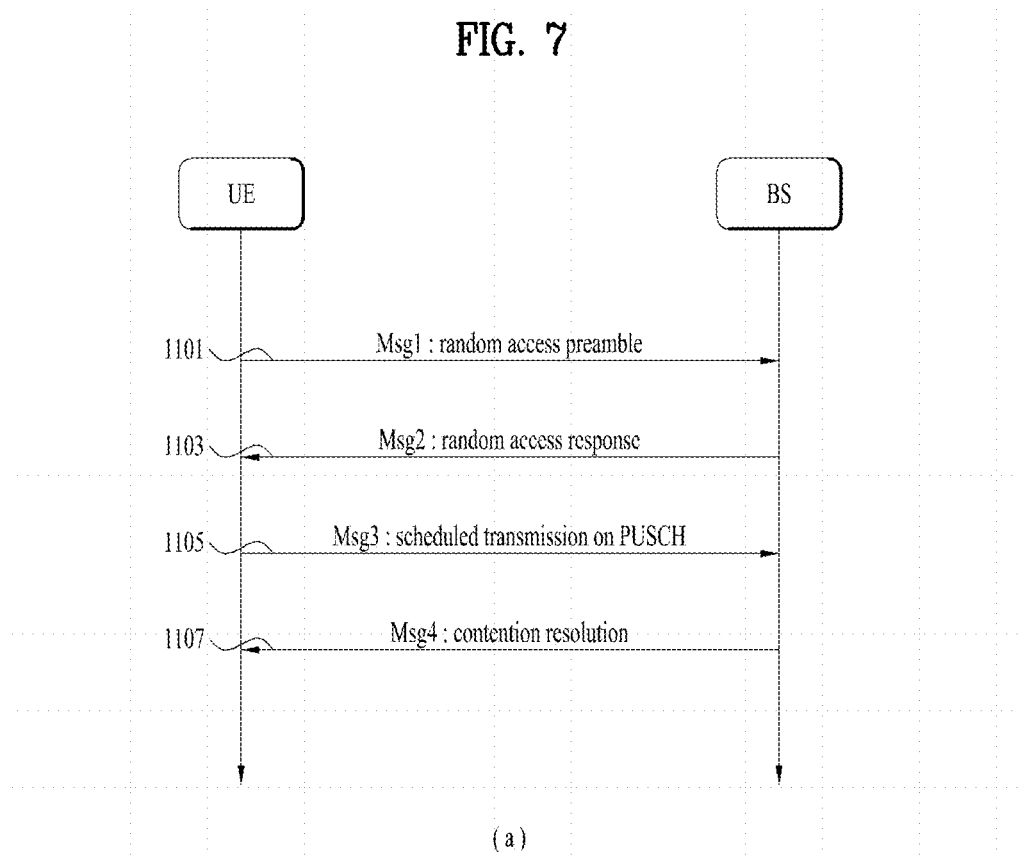
FIG. 7 is a diagram illustrating an exemplary 4-step RACH procedure to which various embodiments of the present disclosure are applicable.
Figure 7:
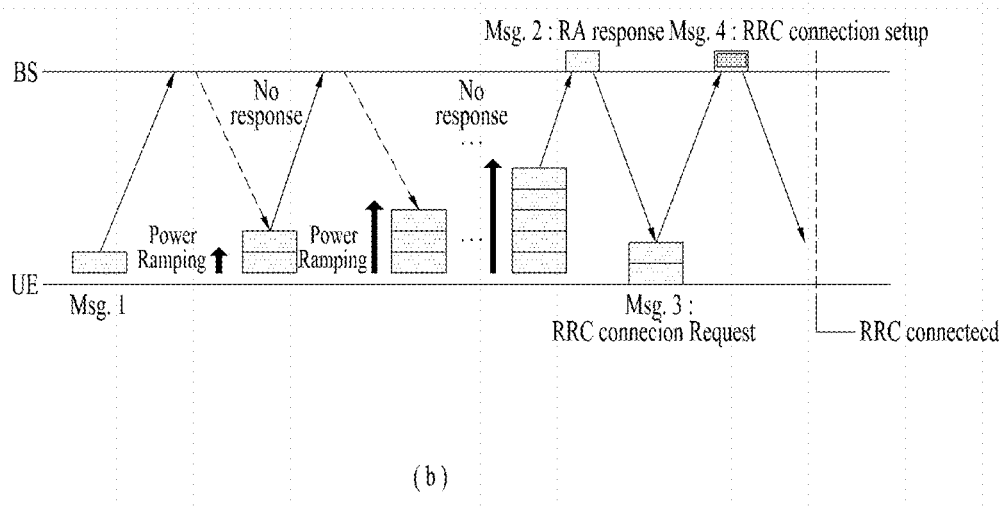

FIG. 2 illustrates an example with $\mu=2$ (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

1.2. Physical Resources

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
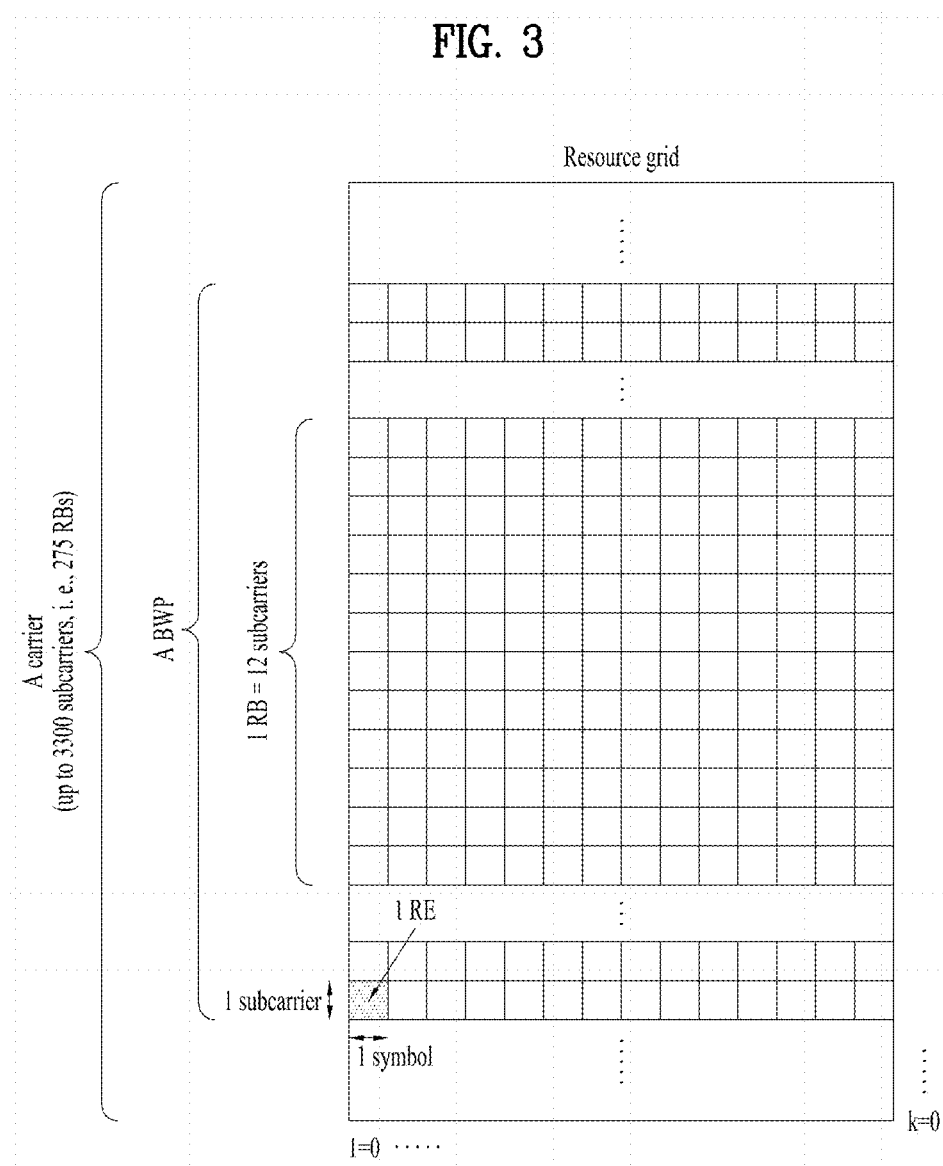
FIG. 3 is a diagram illustrating mapping of physical channels in a slot, to which various embodiments are applicable.

FIG. 3 illustrates an exemplary resource grid to which various embodiments are applicable.

Referring to FIG. 3, for each subcarrier spacing (SCS) and carrier, a resource grid is defined as $14 \times 2^{\mu}$ OFDM symbols by $N^{size,\mu}_{grid} \times N^{RB}_{SC}$ subcarriers, where $N^{size,\mu}_{grid}$ is indicated by RRC signaling from the BS. $N^{size,\mu}_{grid}$ may vary according to an SCS configuration $\mu$ and a transmission direction, UL or DL. There is one resource grid for an SCS configuration $\mu$, an antenna port p, and a transmission direction (UL or DL). Each element of the resource grid for the SCS configuration $\mu$ and the antenna port p is referred to as an RE and uniquely identified by an index pair (k, l) where k represents an index in the frequency domain, and l represents a symbol position in the frequency domain relative to a reference point. The RE (k, l) for the SCS configuration $\mu$ and the antenna port p corresponds to a physical resource and a complex value $a^{(p,\mu)}_{k,l}$. An RB is defined as $N^{RB}_{SC}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner The PUCCH delivers UCI, an HARQ-ACK, and/or an SR and is classified as a short PUCCH or a long PUCCH according to the transmission duration of the PUCCH.

1.4. UL-DL Timing Relationship

Timing advance maintenance on UL will now be described.

In a system based on OFDM technology, a time required for a signal transmitted by a UE to reach a BS may vary depending on the radius of a cell, the location of the UE within the cell, and/or the moving speed of the UE. That is, if the BS does not separately manage transmission signal timings of respective UEs, there is a possibility that a transmission signal of a UE may interfere with signals transmitted by other UEs, and thus an error rate of signals received by the BS increases.

More specifically, a time consumed for a signal transmitted by a UE attempting to perform transmission at a cell edge to arrive at the BS will be longer than a time required for a signal transmitted by a UE at the center of the cell to arrive at the BS. Conversely, a time required for a signal transmitted by the UE located at the center of the cell to arrive at the BS will be relatively shorter than that of the UE located at the edge of the cell.

Since data or signals that all UEs in the cell transmit should be received within every valid time boundary in order to prevent interference in terms of the BS, the BS needs to appropriately adjust transmission timings of the signals transmitted by the UEs according to situations of the UEs and this adjustment is referred to as timing advance management.

One method of managing a timing advance may be a random access operation. That is, the random access operation causes the BS to receive a random access preamble transmitted by the UE. The BS calculates a timing advance value to make a transmission timing of the UE faster or slower using information about the received random access preamble. Then, the BS informs the UE of the calculated timing advance value through a random access response. The UE updates a UL transmission timing using the timing advance value.

As another method, the BS receives a sounding reference signal (SRS) periodically or randomly transmitted by the UE and calculates the timing advance value for the UE through the received signal. The BS informs the UE of the timing advance value and then the UE updates a transmission timing thereof.

As described above, the BS measures the transmission timing of the UE through the random access preamble or the SRS, calculates a timing value to be corrected, and informs the UE of the timing value to be corrected. The timing advance value (i.e., timing value to be corrected) transmitted by the BS to the UE is referred to as a timing advance command (TAC). The TAC is processed in a MAC layer. Since the UE is not always located at a fixed position, the transmission timing of the UE is changed at every time according to the moving speed of the UE and the location of the UE.

In this regard, upon receiving the TAC once from the BS, the UE needs to assume that the TAC is not always valid for an infinite time but the TAC is valid only for a specific time. A timing advance timer (TAT) is used for this purpose. That is, upon receiving the TAC from the BS, the UE starts the TAT. The UE assumes that a UL timing thereof is synchronized with the BS when the TAT is in operation. The value of the TAT may be transmitted through an RRC signal such as system information or radio bearer reconfiguration. Upon receiving a new TAC from the BS while the TAT is in operation, the UE restarts the TAT. When the TAT expires or the TAT does not operate, the UE does not transmit any UL signals, such as PUSCH and PUCCH signals, except for the random access preamble, under the assumption that the UL timing of the UE is not synchronized with the BS.

Figure 4:
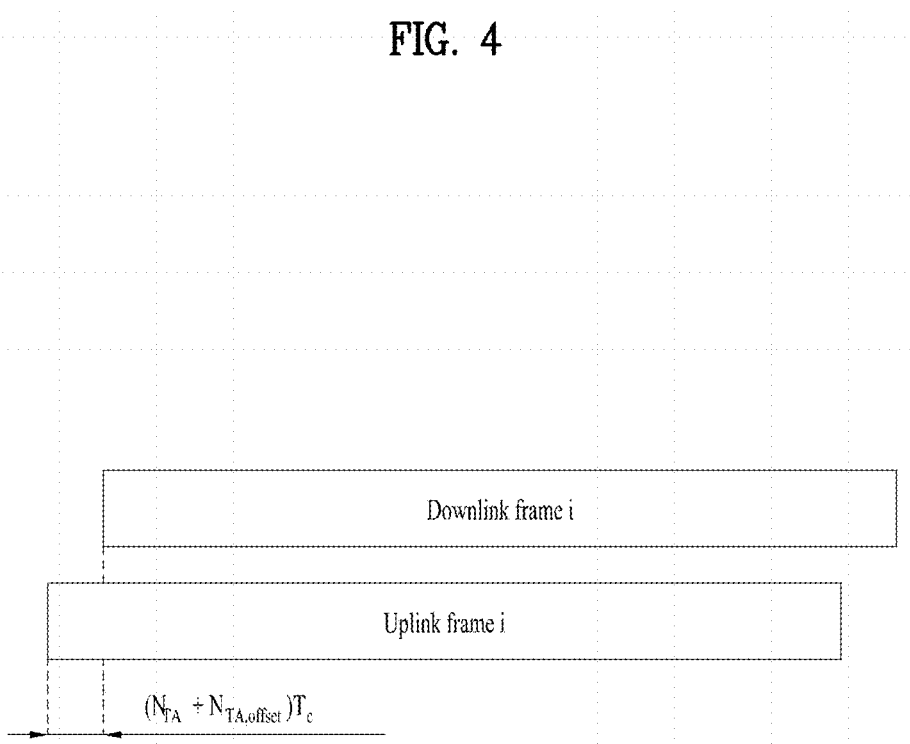
FIG. 4 is a diagram illustrating an exemplary UL-DL timing relationship, which is applicable to various embodiments of the present disclosure.

FIG. 4 is a diagram illustrating an exemplary UL-DL timing relationship applicable to various embodiments of the present disclosure.

Referring to FIG. 4, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, TA for a timing advance group (TAG) indicates $N_{TA}$ values by index values of $T_A=0, 1, 2, \ldots, 3846$, where an amount of the time alignment for a TAG with an SCS of $2^\mu*15$ kHz is $N_{TA} (=T_A*16*64/2^\mu)$. $N_{TA}$ is relative to the SCS of a first UL transmission from the UE after reception of a random access response.

In other cases, a TA command, TA for a TAG indicates adjustment of a current $N_{TA}$ value, $N_{TA\_old}$ to a new $N_{TA}$ value, $N_{TA\_new}$ by index values of $T_A (=0, 1, 2, \ldots, 63)$, where for a SCS of $2^\mu*15$ kHz, $N_{TA\_new}=N_{TA\_old}+(T_A-31)*16*64/2^\mu$.

1.4. Initial Network Access and Communication Process

Figure 5:
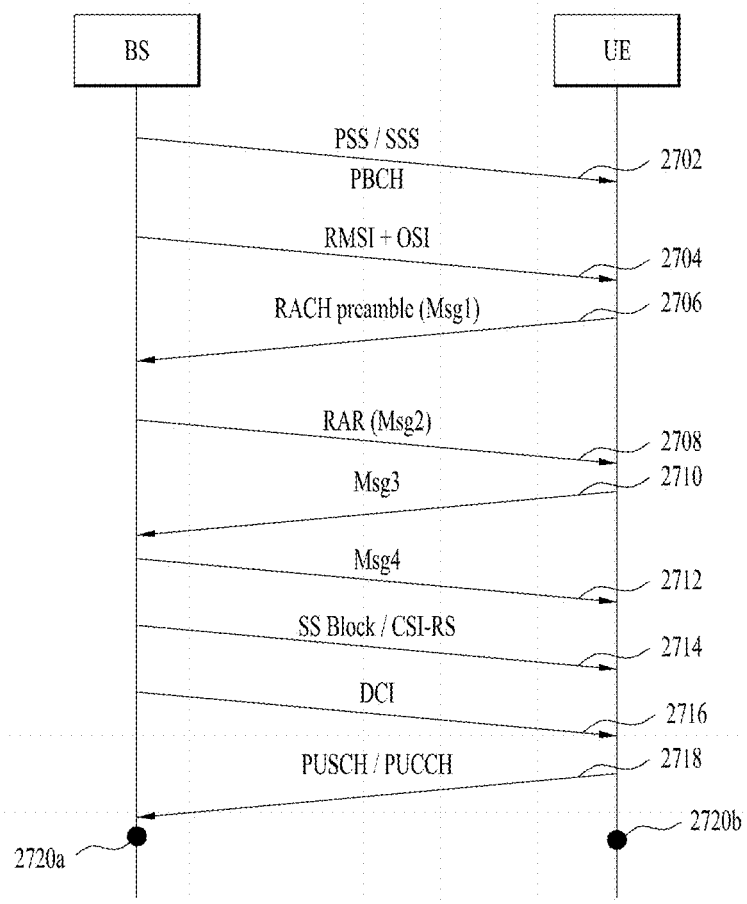
FIG. 5 is a simplified diagram illustrating an initial network access and subsequent communication procedure according to various embodiments of the present disclosure.

FIG. 5 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 5, a BS (e.g., eNB) may periodically transmit an SSB (2702). The SSB includes a PSS/SSS/PBCH. The SSB may be transmitted by beam sweeping. The BS may then transmit remaining minimum system information (RMSI) and other system information (OSI) (2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (2708), the UE may transmit Msg3 (e.g., RRC Connection Request) based on a UL grant included in the RAR (2710), and the BS may transmit a contention resolution message (Msg4) (2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (2714). The SSB/CSI-RS may be used for the UE to generate a beam/CSI report. The BS may request the UE to transmit a beam/CSI report, by DCI (2716). In this case, the UE may generate a beam/CSI report based on the SSB/CSI-RS and transmit the generated beam/CSI report to the BS on a PUSCH/PUCCH (2718). The beam/CSI report may include a beam measurement result, information about a preferred beam, and so on. The BS and the UE may switch beams based on the beam/CSI report (2720a and 2720b).

Figure 6:
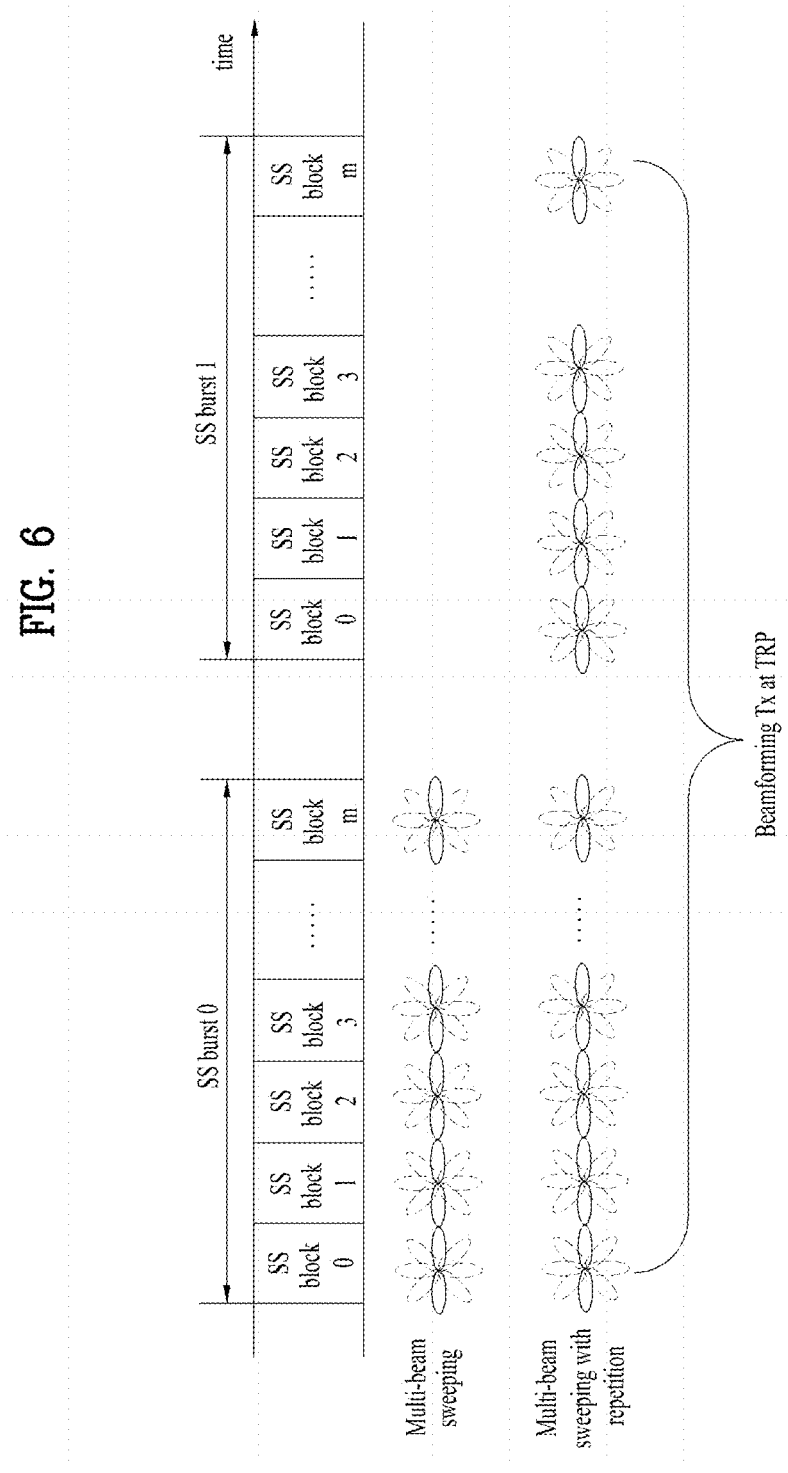
FIG. 6 is a diagram illustrating exemplary multi-beam transmission to which various embodiments are applicable.

FIG. 6 is a diagram illustrating exemplary multi-beam transmission to which various embodiments are applicable.

Beam sweeping refers to changing the beam (direction) of a radio signal over time by a transmission reception point (TRP) (e.g., BS/cell) (hereinafter, the terms beam and beam direction are interchangeably used). SSBs may be transmitted periodically by beam sweeping. In this case, SSB indices are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of contiguous SSBs. The maximum number of times that the SSB is transmitted in an SSB burst set, L may have a value of 4, 8, or 64 depending on the frequency band of a carrier. Accordingly, the maximum number of SSB beams in the SSB burst set may be given according to the frequency band of the carrier as follows.

- For frequency range up to 3 GHz, Max number of beams=4
- For frequency range from 3 GHz to 6 GHz, Max number of beams=8
- For frequency range from 6 GHz to 52.6 GHz, Max number of beams=64

When multi-beam transmission is not applied, the number of SSB beams is 1.

When the UE attempts to initially access the BS, the UE may align beams with those of the BS based on the SSB. For example, the UE identifies the best SSB after performing SSB detection. Thereafter, the UE may transmit a RACH preamble to the BS on a PRACH resource linked/corresponding to the index (i.e., beam) of the best SSB. The SSB may be used to align beams between the BS and UE after the initial access.

1.5. Random Access (RACH) Procedure

When a UE initially accesses a BS or has no radio resources for a signal transmission, the UE may perform a random access procedure with the BS.

The random access procedure is used for various purposes. For example, the random access procedure may be used for initial network access in an RRC_IDLE state, an RRC connection reestablishment procedure, handover, UE-triggered UL data transmission, transition in an RRC_INACTIVE state, time alignment establishment in SCell addition, OSI request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (4-step RACH) procedure and a 2-step random access (2-step RACH) procedure.

1.5.1. 4-Step RACH: Type-1 Random Access Procedure

Figure 14:
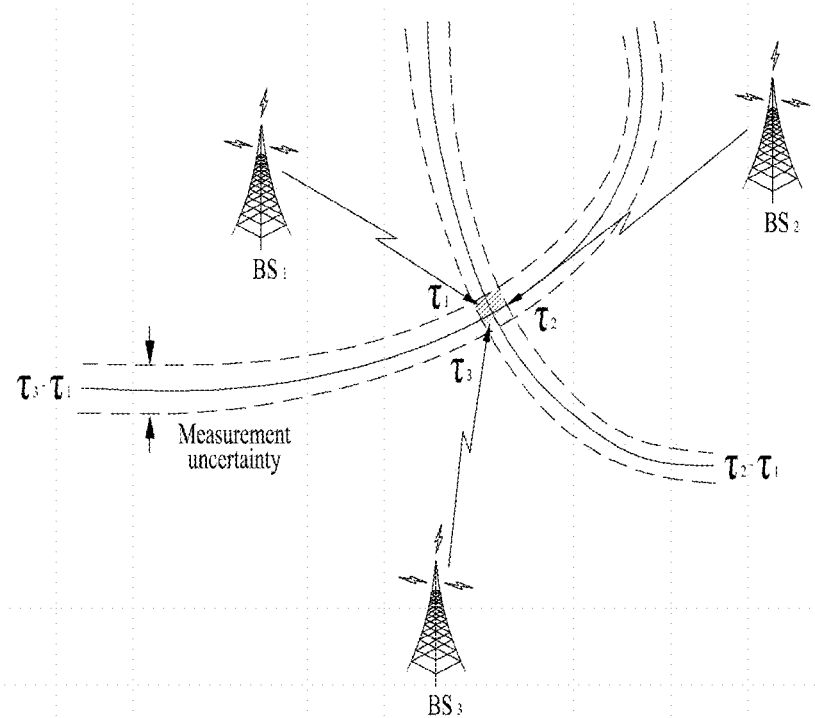
FIG. 14 is a diagram illustrating an observed time difference of arrival (OTDOA) positioning method, to which various embodiments are applicable.

FIG. 14 is a diagram illustrating an exemplary 4-step RACH procedure to which various embodiments of the present disclosure are applicable.

When the (contention-based) random access procedure is performed in four steps (4-step RACH procedure), the UE may transmit a message (Message 1 (Msg1)) including a preamble related to a specific sequence on a PRACH (1401) and receive a PDCCH and a response message (RAR message) (Message 2 (Msg2)) for the preamble on a PDSCH corresponding to the PDCCH (1403). The UE transmits a message (Message 3 (Msg3)) including a PUSCH based on scheduling information included in the RAR (1405) and perform a contention resolution procedure involving reception of a PDCCH signal and a PDSCH signal corresponding to the PDCCH signal. The UE may receive a message (Message 4 (Msg4)) including contention resolution information for the contention resolution procedure from the BS (1707).

The 4-step RACH procedure of the UE may be summarized in Table 5 below.

TABLE 5

| | Type of Signals | Operations/Information obtained |
|---|---|---|
| $1^{st}$ step | PRACH preamble in UL | Initial beam obtainment<br>Random selection of RA-preamble ID |
| $2^{nd}$ step | Random Access Response on DL-SCH | Timing Advanced information<br>RA-preamble ID<br>Initial UL grant, Temporary C-RNTI |
| $3^{rd}$ step | UL transmission on UL-SCH | RRC connection request<br>UE identifier |
| $4^{th}$ step | Contention Resolution on DL | Temporary C-RNTI on PDCCH for initial access<br>C-RNTI on PDCCH for UE in RRC_CONNECTED |

In the random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits a RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in an RACH resource associated with the selected SSB. For example, when retransmitting the RACH preamble, the UE may reselect one of the SSBs and retransmit the RACH preamble in an RACH resource associated with the reselected SSB. That is, the RACH resource for the retransmission of the RACH preamble may be identical to and/or different from the RACH resource for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest pathloss and a power ramping counter.

The RAR information may include a preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may measure the time difference between a PUSCH/PUCCH/SRS reception and a subframe and transmit the timing advance information based on the time difference. The UE may transmit a UL signal as Msg3 of the random access procedure on a UL-SCH based on the RAR information. Msg3 may include an RRC connection request and a UE ID. The network may transmit Msg4 in response to Msg3. Msg4 may be treated as a contention resolution message on DL. As the UE receives Msg4, the UE may enter an RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant starts from the most significant bit (MSB) and ends in the least significant bit (LSB), given as Table 6.

TABLE 6

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 7.

TABLE 7

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

1.5.2. 2-Step RACH: Type-2 Random Access Procedure

Figure 8:
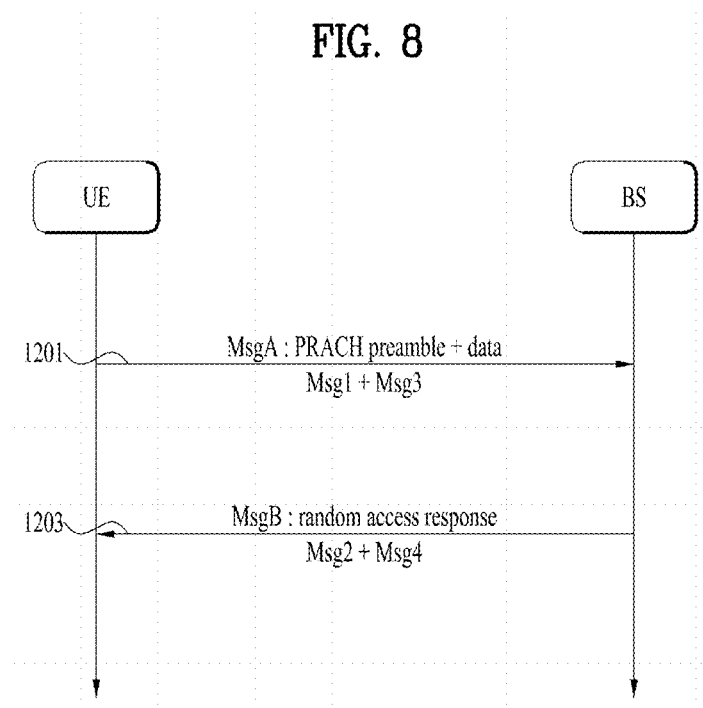
FIG. 8 is a diagram illustrating an exemplary 2-step RACH procedure to which various embodiments of the present disclosure are applicable.

FIG. 8 is a diagram illustrating an exemplary 2-step RACH procedure to which various embodiments of the present disclosure are applicable.

The (contention-based) RACH procedure performed in two steps, that is, the 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (1501).

Further, in the 2-step RACH procedure, the BS may combine Msg2 and Msg4 of the 4-step RACH procedure into one message (e.g., MsgB) and transmit the message to the UE (1503).

The 2-step RACH procedure may become a low-latency RACH procedure based on the combinations of these messages.

More specifically, MsgA may carry a PRACH preamble included in Msg1 and data included in Msg3 in the 2-step RACH procedure. In the 2-step RACH procedure, MsgB may carry an RAR included in Msg2 and contention resolution information included in Msg4.

1.5.3. Mapping Between SSB Blocks and PRACH Resource (Occasion)

Figure 9:
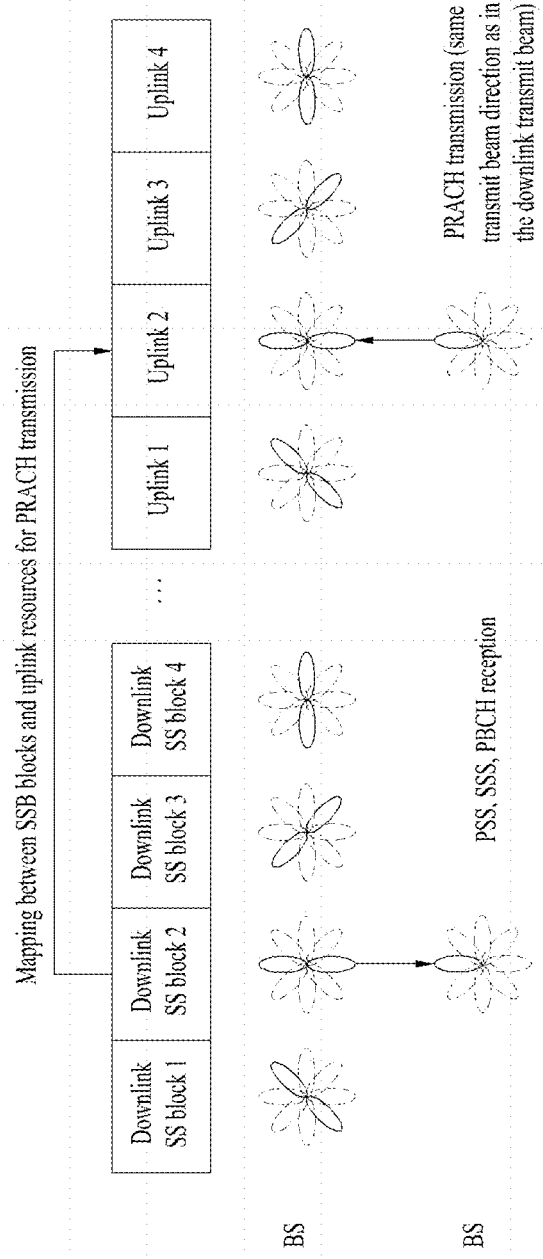
FIG. 9 is a diagram showing an example of an SS block and a PRACH resource linked to the SS block according to various embodiments of the present disclosure.
Figure 10:
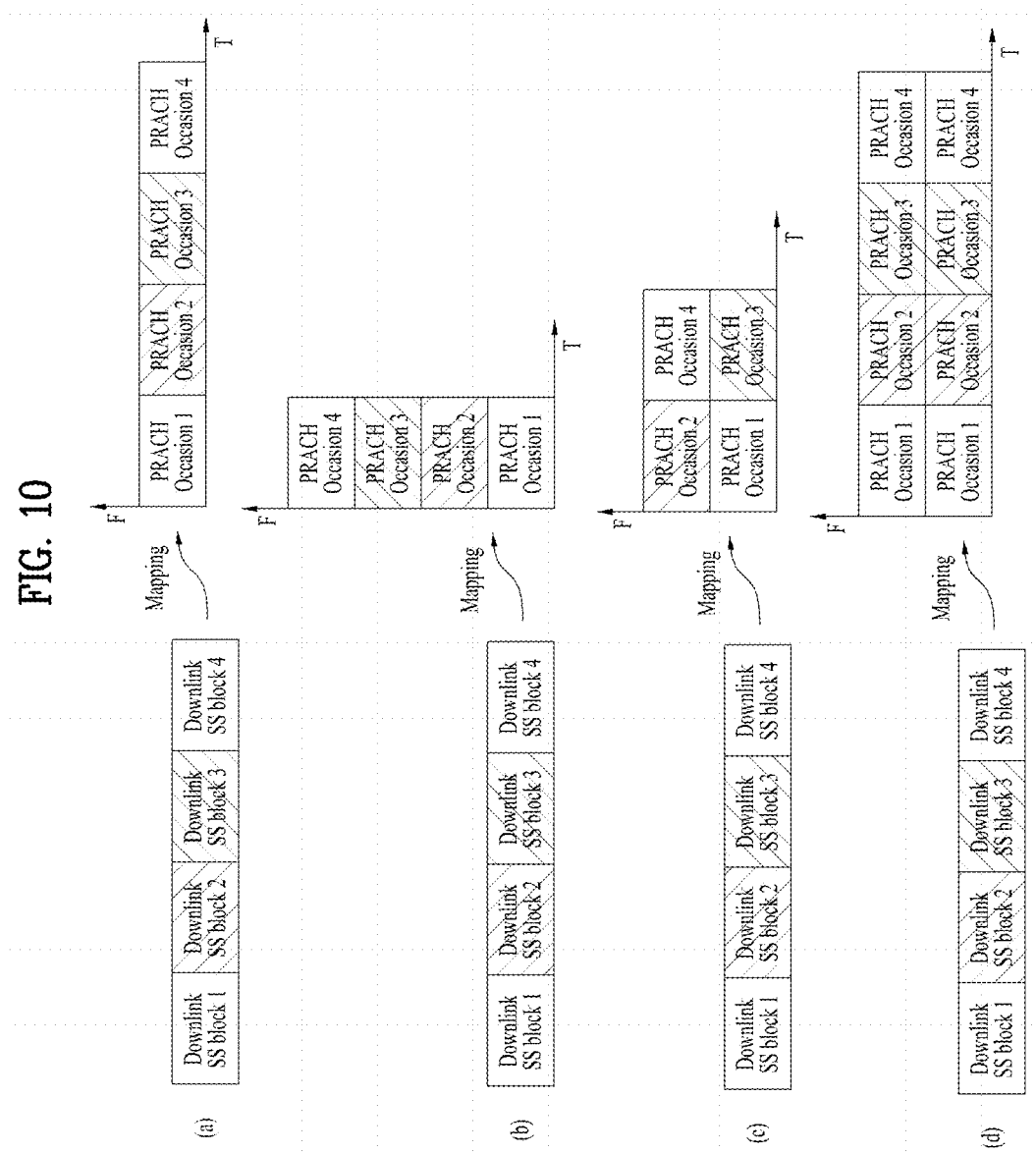
FIG. 10 is a diagram showing an example of an SS block and a PRACH resource linked to the SS block according to various embodiments of the present disclosure.

FIGS. 9 and 10 are diagrams showing an example of transmission of an SS block and a PRACH resource linked to the SS block according to various embodiments of the present disclosure.

In order for a BS to communicate with one UE, an optimum beam direction between the BS and the UE needs to be found, and as the UE moves, the optimum beam direction may be changed, and thus the optimum beam direction needs to be continuously tracked. A procedure of finding the optimum beam direction between a BS and a UE may be referred to as a beam acquisition procedure, and a procedure of continuously tracking the optimum beam direction may be referred to as a beam tracking procedure. The procedure may be required for a state in which the optimum beam is lost and communication with the BS is not capable of being maintained in an optimum communication state or enters a state in which communication is impossible, that is, beam recovery for recovering beam failure during 1) initial access in which the UE attempts first access to the BS, 2) handover from one BS to another BS, and 3) beam tracking of finding an optimum beam between the UE and the BS.

A multi-step beam acquisition procedure is being discussed for beam acquisition in an environment using multiple beams in the case of the NR system. In the multi-step beam acquisition procedure, the BS and the UE may perform connection setup using a wide beam in an initial access stage, and after the connection setup is completed, the BS and the UE may perform communication with the optimum quality using a narrow beam. An example of the beam acquisition procedure in an NR system to which various embodiments of the present disclosure will be described below.

1) The BS may transmit a synchronization block for each wide bam in order for the UE to find a BS in an initial access stage, that is, to perform cell search or cell acquisition, to measure the quality for a channel for each beam of a wide beam, and to find an optimum wide beam to be used in a primary stage of beam acquisition.

2) The UE may perform cell search on a synchronization block for each beam and may perform DL beam acquisition using a detection result for each beam.

3) The UE may perform an RACH procedure in order to inform that the UE intends to access a BS that the UE finds.

4) In order for the UE to notify the BS of the DL beam acquisition result (e.g., a beam index) at a wide beam level simultaneously with the RACH procedure, the BS may connect or relate a synchronization block transmitted for each beam and a PRACH resource to be used for PRACH transmission. When the UE performs the RACH procedure using the PRACH resource connected to the optimum beam direction that the UE finds, the BS may acquire information on a DL beam appropriate for the UE during a procedure of receiving a PRACH preamble.

In a multi-beam environment, it may be important to accurately determine a Tx beam and/or a Rx beam direction between the UE and a transmission and reception point (TRP) by the UE and/or the TRP. In the multi-beam environment, beam sweeping for repeatedly transmitting a signal or receiving a signal depending on TX/RX reciprocal capability of the TRP (e.g., a BS) or a UE may be considered. The TX/RX reciprocal capability may be referred to as TX/RX beam correspondence in the TRP and the UE. In the multi-beam environment, when the TX/RX reciprocal capability in the TRP and the UE is not held, the UE may shoot a UL signal in a beam direction in which the UE receives a DL signal. This is because an optimum path of UL and an optimum path of DL are different. The TX/RX beam correspondence in the TRP may be held when the TRP determines a TRP RX beam for corresponding UL reception based on DL measurement of the UE with respect to one or more TX beams of the TRP and/or the TRP determines a TRP TX beam for corresponding DL transmission based on UL measurement of TRP' with respect to one or more RX beams of the TRP. The TX/RX beam correspondence in the UE may be held when the UE determines a UE RX beam for corresponding UL transmission based on DL measurement of the UE with respect to one or more RX beams of the UE and/or the UE determines a UE RX beam for corresponding DL reception based on indication of the TRP based on UL measurement with respect to one or more TX beams of the UE.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 11:
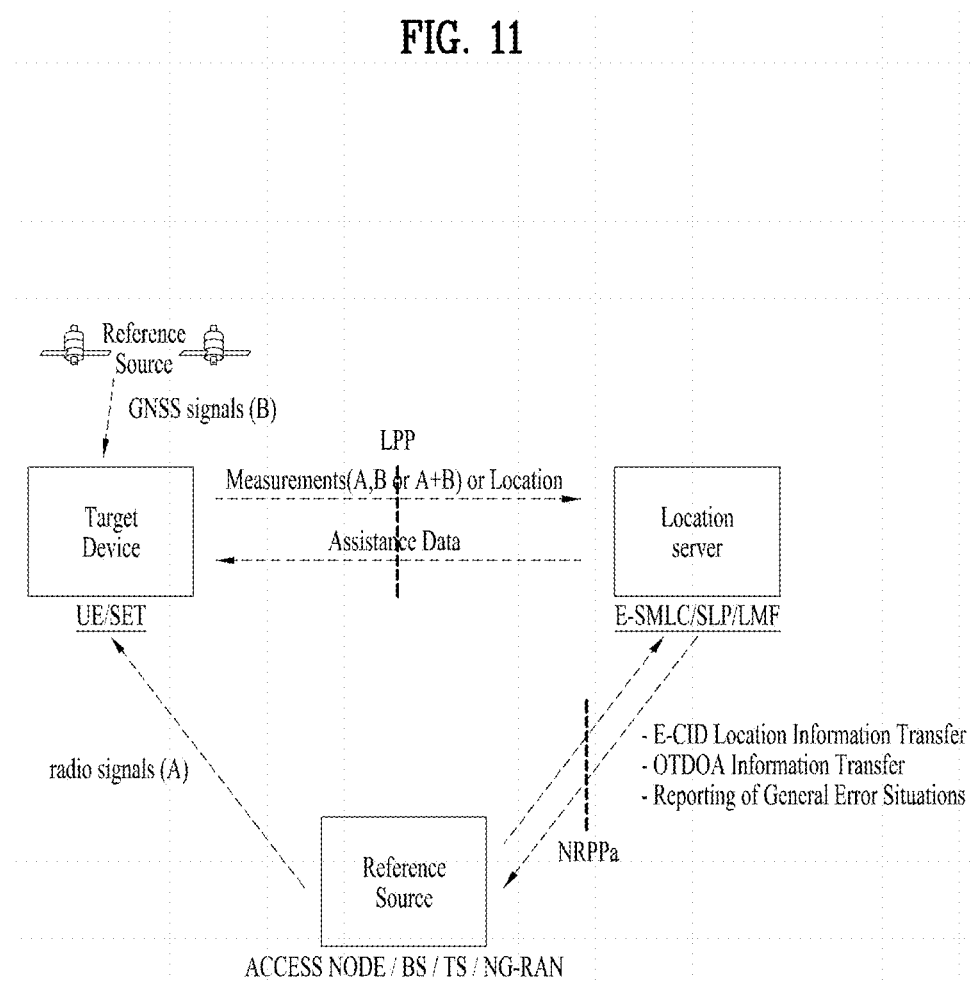
FIG. 11 is a diagram illustrating a positioning protocol configuration for positioning a user equipment (UE), to which various embodiments are applicable.

FIG. 11 is a diagram illustrating an exemplary positioning protocol configuration for positioning a UE, to which various embodiments are applicable.

Referring to FIG. 11, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Protocol for Positioning Measurement

LTE Positioning Protocol (LPP)

Figure 12:
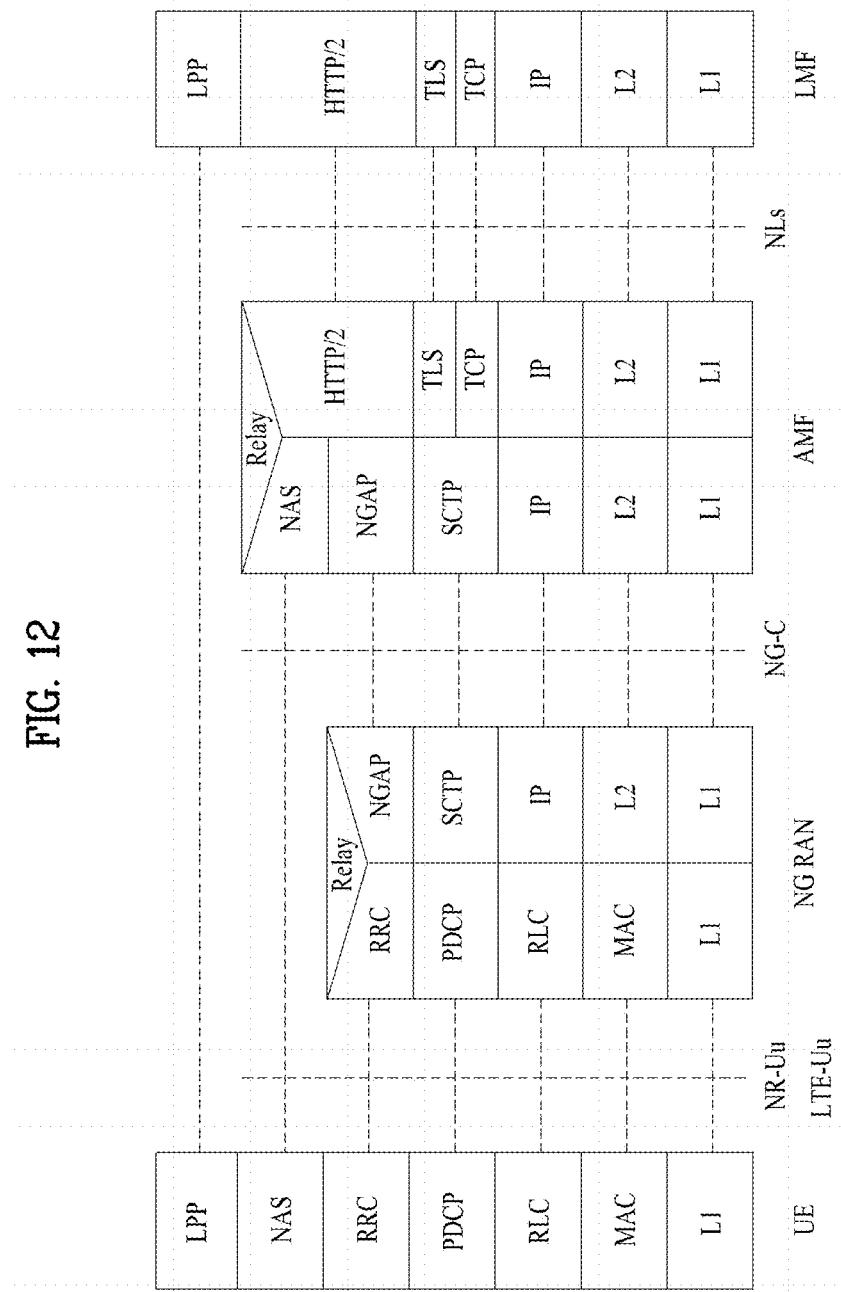
FIG. 12 is a diagram illustrating protocol layers for supporting LTE positioning protocol (LPP) message transmission, to which various embodiments are applicable.

FIG. 12 is a diagram illustrating exemplary protocol layers for supporting LPP message transmission, to which various embodiments are applicable. An LPP PDU may be transmitted in a NAS PDU between an AMF and a UE.

Referring to FIG. 12, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

FIG. 13 is a diagram illustrating exemplary protocol layers for supporting NRPPa PDU transmission, to which various embodiments are applicable.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.3. Positioning Measurement Method

Positioning methods supported in the NG-RAN may include a Global Navigation Satellite System (GNSS), an OTDOA, an enhanced cell ID (E-CID), barometric sensor positioning, WLAN positioning, Bluetooth positioning, a terrestrial beacon system (TBS), uplink time difference of arrival (UTDOA) etc. Although any one of the positioning methods may be used for UE positioning, two or more positioning methods may be used for UE positioning.

OTDOA (Observed Time Difference of Arrival)

FIG. 14 is a view illustrating an OTDOA positioning method, which may be used in various embodiments.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 5]

where c is the speed of light, {xt, yt} are (unknown) coordinates of a target UE, {xi, yi} are (known) coordinates of a TP, and {x1, y1} are coordinates of a reference TP (or another TP). Here, (Ti–T1) is a transmission time offset between two TPs, referred to as "real time differences" (RTDs), and ni and n1 are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, TADV may be divided into Type 1 and Type 2 as follows.

TADV Type 1=(ng-eNB RX-TX time difference)+(UE E-UTRA RX-TX time difference)

TADV Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 15:
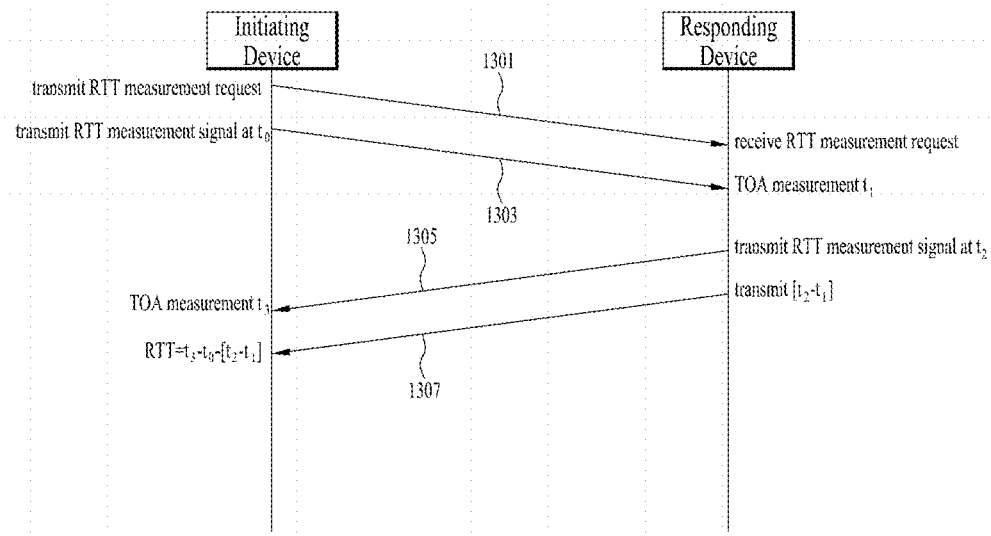
FIG. 15 is a diagram illustrating a multi-round trip time (multi-RTT) positioning method to which various embodiments are applicable.
Figure 15:
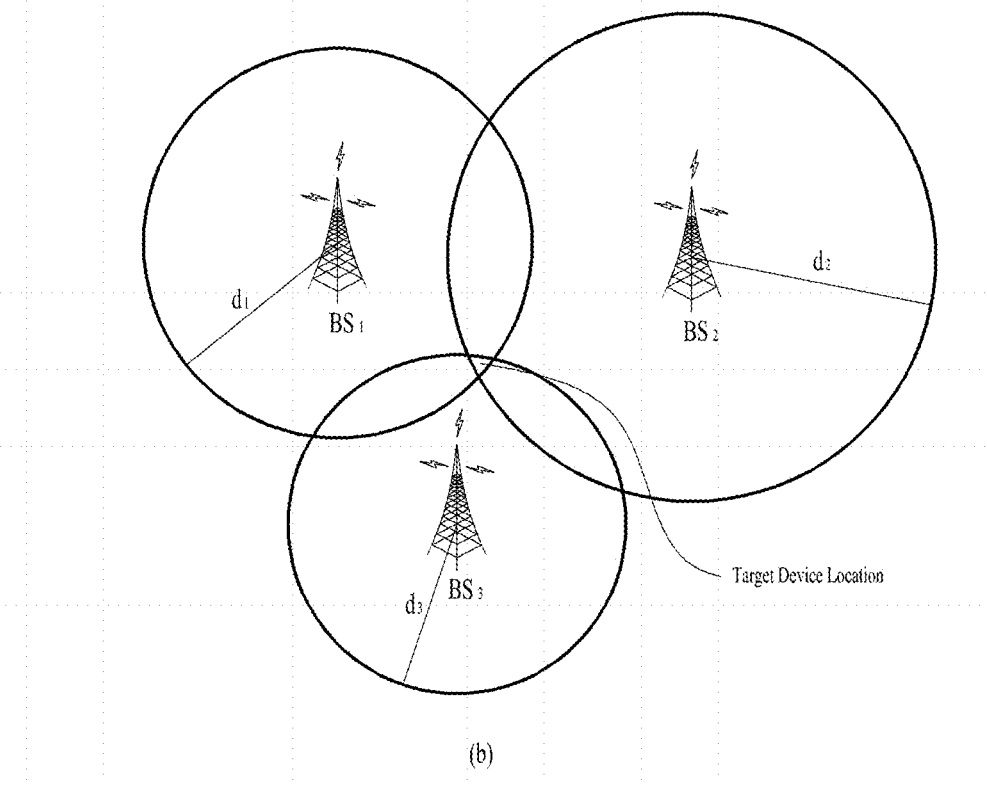

FIG. 15 is a diagram illustrating an exemplary multi-round trip time (multi-RTT) positioning method to which various embodiments are applicable.

Referring to FIG. 15(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2–t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1]$$ [Equation 6]

Referring to FIG. 15(b), the RTT may correspond to a double-range measurement between the two devices. Positioning estimation may be performed from the information. Based on the measured RTT, d1, d2 and d3 may be determined, and a target device location may be determined to be the intersection of circles with BS1, BS2, and BS3 (or TRPs) at the centers and radiuses of d1, d2 and d3.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
CSI-RS: channel state information reference signal
LMF: location management function
PRS: positioning reference signal
RS: reference signal
RSRP: reference signal received power
RTT: round trip time
Rx-Tx time difference: receive-transmit time difference (transmit/receive time difference)
  1) UE Rx-Tx time difference: According to various embodiments, the UE Rx-Tx time difference may be defined as $T_{UE-RX} - T_{UE-TX}$. According to various embodiments, $T_{UE-RX}$ is a UE received timing of DL subframe (and/or frame/slot/symbol, etc.) #i from a positioning node, and may be defined by a path first detected in time. According to various embodiments, $T_{UE-TX}$ may be a UE transmission timing of the nearest UL subframe (and/or frame/slot/symbol, etc.) #j from the subframe (and/or frame/slot/symbol, etc.) #i received from the positioning node (where #i and #j are indexes, and may each have an integer greater than or equal to 0). According to various embodiments, one or more DL PRS resources may be used to determine the start of a subframe (and/or frame/slot/symbol, etc.) of the first arrival path of the positioning node.

2) gNB Rx-Tx time difference: According to various embodiments, the gNB Rx-Tx time difference may be defined as $T_{gNB-RX}-T_{gNB-TX}$. According to various embodiments, $T_{gNB-RX}$ may be a positioning node received timing of UL subframe (and/or frame/slot/symbol, etc.) #i including a sounding reference signal (SRS) associated with a UE, and may be defined by a path first detected in time. According to various embodiments, $T_{gNB-TX}$ may be a positioning node transmit timing of the nearest DL subframe (and/or frame/slot/symbol, etc.) #j in time from the subframe (and/or frame/slot/symbol, etc.) #i received from the UE (where #i and #j are indexes, and may each have an integer value greater than or equal to 0). According to various embodiments, one or more SRS resources for positioning may be used to determine the start of a subframe (and/or frame/slot/symbol, etc.) including an SRS. According to various embodiments, the gNB may be replaced with an eNB/base station (BS)/TRP.

SRS: sounding reference signal
SS: synchronization signal
SSB: synchronization signal block
SS/PBCH: synchronization signal/physical broadcast channel
TA: timing advance/time advance
ToA: time of arrival
TRP: transmission and reception point (TP: transmission point)
Tx: transmit/transmission, Rx: receive/reception In the description of various embodiments, the BS may be understood as a comprehensive term including a remote radio head (RRH), an eNB, a gNodeB, a TP, a reception point (RP), and a relay.

In the description of various embodiments, the network/network node may be a BS and/or a location server.

In the description of various embodiments, a BS, a gNB, a cell, or the like may be replaced with a TRP, a TP, or any device that performs the same function.

In the description of various embodiments, the location server may be replaced with an LMF or any device that performs the same function.

In the description of various embodiments, "exceeding/greater than or equal to A" may be replaced with "greater than or equal to/exceeding A."

In the description of various embodiments, "less than/less than or equal to B" may be replaced with "less than or equal to/less than B."

In the description of various embodiments, message #1, message #2, message #3, and message #4 may be replaced with message 1, message 2, message 3, and message 4, respectively, and may be understood to be the same. Conversely, in the description of various embodiments, message 1, message 2, message 3, and message 4 may be replaced with message #1, message #2, message #3, and message #4, respectively, and may be understood to be the same.

In the description of various embodiments, message #A and message #B may be replaced with message A and message B, respectively, and may be understood to be the same. Conversely, in the description of various embodiments, messages A and B may be replaced with messages #A and #B, respectively, and may be understood to be the same.

In the description of various embodiments, unless otherwise stated, all operations of a UE may be configured/indicated by a network entity (e.g., another UE/automobile/relay node/BS/location server/LMF, etc.). For example, all operations of a UE may include configuration/determination by the UE. In the description of various embodiments, a BS of a wireless network is mainly mentioned as a subject to indicate/configure an operation of a UE, but an operation of a specific UE may be configured/indicated by another other network entity such as another UE. When the network entity is changed, the physical/logical path/channel of signaling may be changed. However, in the description of various embodiments given below, the change may be included in the present disclosure when the proposed embodiments may be easily applied.

In the description of various embodiments, unless otherwise stated, the operation of the location server may be an operation according to an instruction/request of the BS.

In the description of various embodiments, unless otherwise stated, a transmission time may mean a start time of transmission and/or an end time of transmission.

In the description of various embodiments, unless otherwise stated, a reception time may mean a start time of reception and/or an end time of reception.

In the description of various embodiments, unless otherwise stated, the RTT may be replaced with the TA, and the TA may be replaced with the RTT. For example, considering that the RTT corresponds to the round trip time, the TA may be acquired based on the RTT. For example, the RTT and the TA may be the same, but embodiments are not limited thereto. Any case where the TA is calculated/acquired from/based on the RTT may be included in various embodiments.

Various embodiments may be applied to an initial access procedure and/or a subsequent procedure. Various embodiments may be applied to an RRC connected/idle/inactive UE. Various embodiments may also be applied to a per-beam TA configuration considering an Rx beam (and/or a Tx beam) of a BS and/or a Tx beam (and/or an Rx beam) of a UE. Various embodiments may be applied/extended/applied even when different TAs are configured/indicated for cells/BSs/TRPs.

Various embodiments may relate to a TA configuration/indication method. Various embodiments may relate to a TA configuration/indication method using measurement of a transmission/reception time difference between a UE and a BS. For example, the embodiments may relate to a TA configuration/indication method using UE Rx-Tx time difference measurement and BS Rx-Tx time difference measurement.

For example, an accurate TA value may not be determined according to a TA determination method based on measurement by a BS/network of a propagation time for a UL signal transmitted by a UE. For example, considering an autonomous TA change and/or a mismatch between UL propagation time and DL propagation time according to a change in DL reception timing of a UE, the TA value may be more accurately determined based on the RTT rather than a unidirectional signal.

For example, it may be considerably important for the BS to configure/indicate the correct TA to the UE, and the importance may be higher in terms of UE positioning. For example, in data communication, even when the TA is misaligned to a certain degree or higher, no particular issue may arise as long as data is received within a cyclic prefix (CP) from the receiver perspective. However, as another example, when measurement of the propagation time/ToA between the transmitter and the receiver is required for UE positioning, it may be important for the BS/TRP/location server to identify the exact time when the UE transmits a UL signal. For example, the TA accuracy required in terms of UE positioning may be greater than the TA accuracy required in terms of data communication.

For example, considering a random access procedure (or random access channel (RACH) procedure), a BS receiving message #1 (RACH preamble) transmitted by a UE may identify/acquire a propagation time between the UE and the BS. For example, the BS may determine/set/indicate a TA value to be used by the UE through message #2 (a random access response (RAR) (RACH response) message) based on the propagation time. For example, the BS may appropriately maintain/adjust the transmission/reception timing between the BS and the UE by continuously updating the TA value of the UE even after the initial access.

However, for example, the transmission timing of the UE considered/expected by the BS may be different from the transmission timing at which the UE transmits the UL signal due to TA adjustment according to a change in the DL reception timing of the UE.

In addition, for example, due to a fading channel environment between the UE and the BS, a propagation time between the UE and the BS measured by the UE by the DL signal may be different from a propagation time between the UE and the BS measured by the BS by the UL signal.

In consideration of this point, a UE Rx-Tx time difference measurement and a gNB(/eNB/BS/TRP) RX-TX Rx-Tx time difference measurement may be performed, respectively, and the TA may be determined and/or configured/indicated based on the measurements. The reason may be that, for example, the UE Rx-Tx time difference measurement of the UE may reflect a change in UL reception timing of the UE and/or a corresponding change in TA of the UE, and may be used together with gNB Rx-Tx time difference measurement to measure and/or reflect both DL and/or UL propagation (time) delays. Even when the accuracy of the measurement value is increased, an error may be produced in relation to accuracy of the UE mobility and/or measurement value due to the UE mobility and/or signaling quantization error, and thus a solution to this issue may be required.

Figure 16:
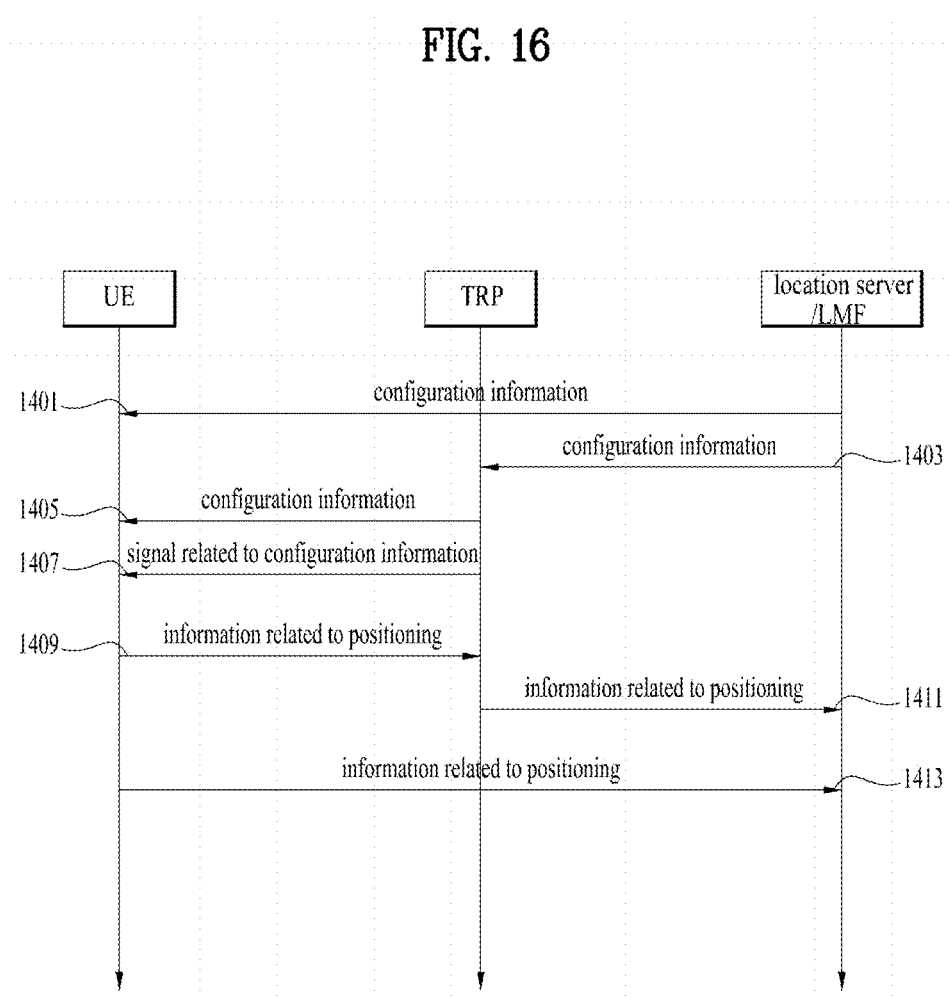
FIG. 16 is a simplified diagram illustrating a method of operating a UE, a transmission and reception point (TRP), a location server, and/or a location management function (LMF) according to various embodiments.

FIG. 16 is a simplified diagram illustrating an operating method of a UE, a TRP, a location server, and/or an LMF according to various embodiments.

Referring to FIG. 16, in operation 1401 according to various embodiments, the location server and/or the LMF may transmit configuration information to the UE and the UE may receive the configuration information.

In operation 1403 according to various embodiments, the location server and/or the LMF may transmit reference configuration information to the TRP and the TRP may receive the reference configuration information. In operation 1405 according to various embodiments, the TRP may transmit the reference configuration information to the UE and the UE may receive the reference configuration information. In this case, operation 1401 according to various embodiments may be omitted.

In contrast, operations 1403 and 1405 according to various embodiments may be omitted. In this case, operation 1401 according to various embodiments may be performed.

That is, operation 1401 according to various embodiments, and operations 1403 and 1405 according to various embodiments may be selectively performed.

In operation 1407 according to various embodiments, the TRP may transmit a signal related to the configuration information and the UE may receive the signal related to the configuration information. For example, the signal related to the configuration information may be a signal for positioning of the UE.

In operation 1409 according to various embodiments, the UE may transmit a signal related to positioning to the TRP and the TRP may receive the signal related to positioning. In operation 1411 according to various embodiments, the TRP may transmit the signal related to positioning to the location server and/or the LMF and the location server and/or the LMF may receive the signal related to positioning.

In operation 1413 according to various embodiments, the UE may transmit the signal related to positioning to the location server and/or the LMF and the location server and/or the LMF may receive the signal related to positioning. In this case, operations 1409 and 1411 according to various embodiments may be omitted.

In contrast, operation 1413 according to various embodiments may be omitted. In this case, operations 1409 and 1411 according to various embodiments may be performed.

That is, operations 1409 and 1411 according to various embodiments, and operation 1413 according to various embodiments may be selectively performed.

According to various embodiments, the signal related to positioning may be obtained based on the configuration information and/or the signal related to the configuration information.

Figure 17:
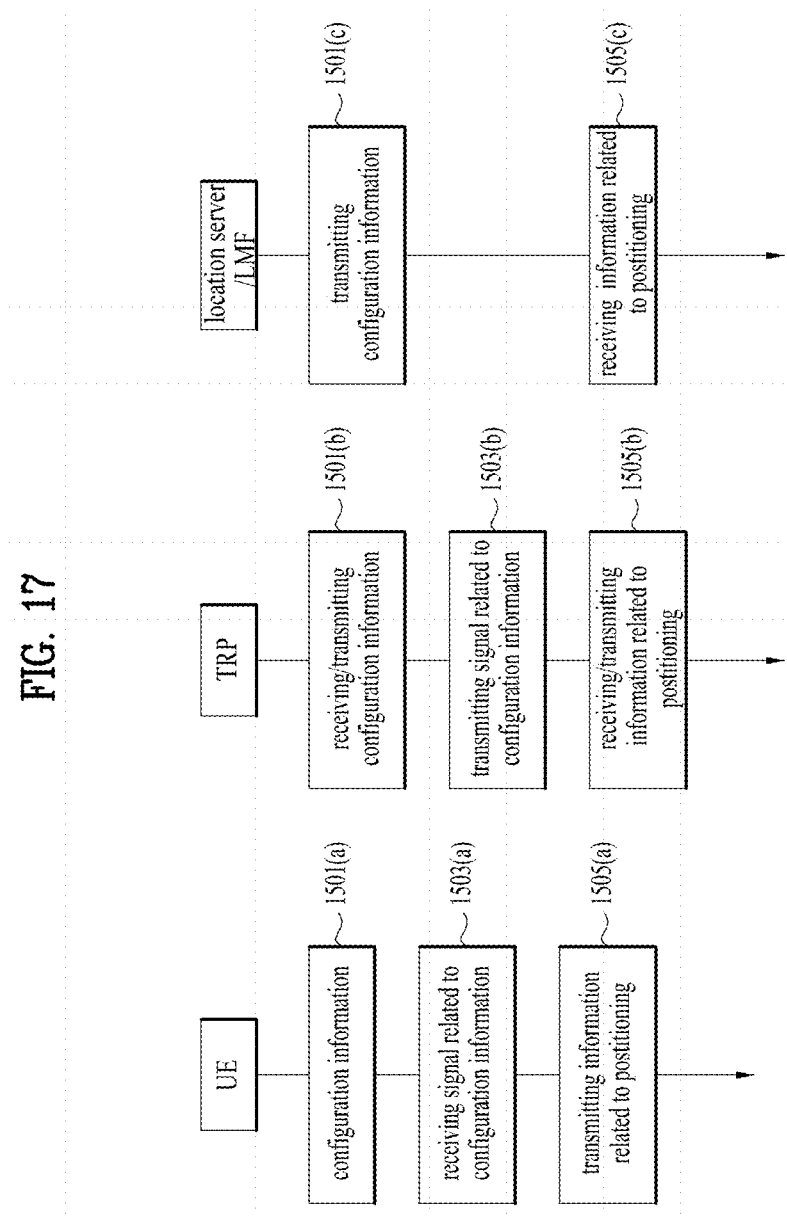
FIG. 17 is a simplified diagram illustrating a method of operating a UE, a TRP, a location server, and/or an LMF according to various embodiments.

FIG. 17 is a simplified diagram illustrating an operating method of a UE, a TRP, a location server, and/or an LMF according to various embodiments.

Referring to FIG. 17(a), in operation 1501(a) according to various embodiments, the UE may receive configuration information.

In operation 1503(a) according to various embodiments, the UE may receive a signal related to the configuration information.

In operation 1505(a) according to various embodiments, the UE may transmit information related to positioning.

Referring to FIG. 17(b), in operation 1501(b) according to various embodiments, the TRP may receive configuration information from the location server and/or the LMF and transmit the configuration information to the UE.

In operation 1503(b) according to various embodiments, the TRP may transmit a signal related to the configuration information.

In operation 1505(b) according to various embodiments, the TRP may receive information related to positioning and transmit the information related to positioning to the location server and/or the LMF.

Referring to FIG. 17(c), in operation 1501(c) according to various embodiments, the location server and/or the LMF may transmit configuration information.

In operation 1505(c) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. All or part of the various embodiments described below may be combined to form other various embodiments unless mutually excluded, which may be clearly understood by those skilled in the art.

Proposal #0 [TA Configuration with Initial Access Procedure]

According to various embodiments, the UE may perform a UE Rx-Tx time difference measurement for a RACH occasion associated/linked with a specific SSB (SS/PBCH block) and/or an SS/PBCH block and report the same to the BS. Specifically, one or more of the following embodiments may be considered.

1) Two-Step RACH Process: Initial TA Configuration

According to various embodiments, "UE Rx-Tx time difference measurement" measured by the UE from the time at which a specific SSB #N (N>0) is received to the time at which the UE transmits message A (first message) on one or more RACH occasions associated/linked with the SSB may be transmitted in message A to the BS.

According to various embodiments, the BS may determine a TA value of the UE based on the received "UE Rx-Tx time difference measurement" and the "gNB Rx-Tx time difference measurement" measured by the BS, and may indicate/set the same for the UE. For example, when the operation is performed in a two-step RACH procedure, the TA value may be included in message B. For example, when 2-step RACH procedure falls back to a 4-step RACH procedure, the TA value may be included in message 2 and/or message 4.

According to various embodiments, the above-described operation of the UE may be indicated/configured by the BS/network. For example, the corresponding indication/configuration information may be included as part of system information and/or RRC signaling and transmitted to the UE.

According to various embodiments, for example, unlike in the 4-RACH procedure, in the 2-step RACH procedure, the UE does not only send a RACH preamble (sequence) to the BS. The UE may also report a "UE Rx-Tx time difference measurement" to the BS because there is a PUSCH resource (PUSCH occasion) associated/linked with the transmitted RACH preamble.

A specific example of the UE Rx-Tx time difference measurement according to various embodiments will be described below.

For example, the "UE Rx-Tx time difference measurement" measured until the time when the RACH preamble is transmitted may be included in the PUSCH resource and transmitted when message A is transmitted. For example, "UE Rx-Tx time difference measurement" may be measured until the start time and/or end time of transmission of the RACH preamble.

For example, the "UE Rx-Tx time difference measurement" measured until the time when message A is transmitted through the PUSCH resource may be transmitted in message A. For example, the "UE Rx-Tx time difference measurement" may be measured until the start time and/or end time of transmission of the PUSCH included in message A.

For example, the "UE Rx-Tx time difference measurement" may be mapped to a PUSCH included in message A, and/or transmitted on the PUSCH included in message A. The PUSCH may be a PUSCH transmitted on one or more (valid) PUSCH occasions to which the PRACH preamble included in message A is mapped.

According to various embodiments, the above-described operation of the UE may be indicated/configured by the BS/network. For example, the corresponding indication/configuration information may be included as part of system information and/or RRC signaling and transmitted to the UE.

According to various embodiments, the BS may find/identify a specific RACH occasion transmitted by the UE. According to various embodiments, since the BS knows the SSB associated/linked with the corresponding RACH occasion, it may calculate/acquire the gNB Rx-Tx time difference. That is, according to various embodiments, the BS may calculate/acquire the RTT to derive/acquire the TA. For example, considering that the RTT is acquired based on the round trip time, the TA may be acquired based on the RTT (e.g., it may be acquired in the same way as in the case of the RTT), which may be generally applied not only in this example but also in various embodiments.

2) Four-Step RACH Process Application: TA-Update

A. [SSB—Msg.1/3]

According to various embodiments, the UE may acquire a "UE Rx-Tx time difference measurement" from the time when the specific SSB #N (>0) is received to the time when the UE transmits message #1 and/or message #3 on one or more RACH occasions associated/linked with the SSB, and report the same to the BS. For example, the "UE Rx-Tx time difference measurement" may be measured until the start time and/or end time of transmission of message #1 and/or message #3.

According to various embodiments, the "UE Rx-Tx time difference measurement" may be included in message #3 (or the PUSCH included in the message) and transmitted to the BS.

According to various embodiments, the BS may calculate/acquire the TA based on the reported information (information about the UE Rx-Tx time difference measurement) and a "gNB Rx-Tx time difference". According to various embodiments, the BS may add TA information to message #4 and transmit the same to the UE. For example, the transmitted TA information (e.g., the TA information included in message #4) may update the TA information/TA configuration transmitted in message #2.

According to various embodiments, the above-described operation of the UE may be indicated/configured by the BS/network. For example, the corresponding indication/configuration information may be included as part of system information and/or RRC signaling and transmitted to the UE.

B. [Msg.2-Msg.3]

According to various embodiments, the UE may acquire a "UE Rx-Tx time difference measurement" from the time when message #2 is received from the BS to the time when message #3 is transmitted in the 4-step RACH procedure and report the same to the BS. For example, the "UE Rx-Tx time difference measurement" may be measured until the start time and/or end time of transmission of message #3.

According to various embodiments, the "UE Rx-Tx time difference measurement" may be included in message #3 (or the PUSCH included in the message) and transmitted to the BS.

According to various embodiments, the BS may calculate/acquire the TA based on the reported information (information about the UE Rx-Tx time difference measurement) and a "gNB Rx-Tx time difference" measurement. According to various embodiments, the BS may add TA information to message #4 and transmit the same to the UE. For example, the transmitted TA information (e.g., the TA information included in message #4) may update the TA information/TA configuration transmitted in message #2.

According to various embodiments, the above-described operation of the UE may be indicated/configured by the BS/network. For example, the corresponding indication/configuration information may be included as part of system information and/or RRC signaling and transmitted to the UE.

For example, in the 4-step RACH procedure, the BS transmits a TA command to the UE through message #2, and accordingly various embodiments may be easily applied to the TA update rather than to the initial TA configuration. However, it should be noted that applying various embodiments to the initial TA configuration is not excluded.

For example, various embodiments may be used to quickly update the TA in the initial access procedure and a subsequent procedure. For example, the UE may apply a TA command delivered through message #2, acquire/calculate a UE Rx-Tx time difference measurement until the time when message #3 is transmitted, and report the measurement in message #3 to the BS (using, for example, at least part of the PUSCH resources). For example, the BS may signal the changed/updated TA value by transmitting message #4 to the UE.

Proposal #1[UE-Based TA Configuration with Initial Access Procedure]

According to various embodiments, the UE may determine/configure a TA value. According to various embodiments, to this end, a specific object/node (e.g., a BS/location server/LMF) of a wireless network may deliver gNB Rx-Tx time difference information to the a UE. Specifically, one or more of the following embodiments may be considered.

According to various embodiments, in the 2-step RACH procedure and the 4-step RACH procedure, one or more of the following embodiments may be considered.

1) Two-Step RACH Application

According to various embodiments, the UE may receive one or more SSBs (and/or SS/PBCH blocks), and select an SSB satisfying a specific level of quality (e.g., a quality acquired from the RSRP or the like) and/or a specific (best) SSB exhibiting the best quality. According to various embodiments, the UE may transmit message A (the first message transmitted by the UE in the 2-step RACH procedure) on a RACH occasion associated/linked with the SSB.

According to various embodiments, the UE may measure/acquire a UE Rx-Tx time difference measurement for the selected SSB and message A transmitted on the RACH occasion. According to various embodiments, the BS/cell/TRP may calculate/acquire a gNBRx-Tx time difference measurement for the SSB transmitted by the BS/cell/TRP and message A transmitted on the RACH occasion associated/linked therewith.

According to various embodiments, the BS/cell/TRP may deliver gNB Rx-Tx time difference measurement information to the UE through message B in the RACH procedure. As another example, when the 2-step RACH procedure falls back to the 4-step RACH procedure, the gNB Rx-Tx time difference measurement information may be included in message 2 and/or message 4.

According to various embodiments, the UE may determine/configure/acquire a TA value based on the gNB Rx-Tx time difference measurement information. According to various embodiments, the TA determination/configuration of the UE may be configured/indicated by the BS/network. According to various embodiments, the above-described operation of the UE may be indicated/configured by the BS/network. For example, the corresponding indication/configuration information may be included as part of system information and/or RRC signaling and transmitted to the UE.

According to various embodiments, the BS/cell/TRP may signal the gNB Rx-Tx time difference measurement information and/or additional information required for the UE to determine/configure/acquire the TA. For example, when operation is performed in the two-step RACH procedure, the additional information may be included in message B. For example, when the 2-step RACH procedure falls back to the 4-step RACH procedure, the additional information may be included in message 2 and/or message 4.

For example, the additional information may include an additional timing offset in addition to the gNB Rx-Tx time difference measurement. For example, it may include downlink uplink (DL UL) switching time information of the BS.

2) Four-Step RACH Application

A. Embodiment A

According to various embodiments, a gNB Rx-Tx time difference measurement may be signaled/transmitted to the UE in consideration of a RACH occasion associated/linked with the SSB in the same/similar manner as in the above-described two-step RACH procedure.

According to various embodiments, the UE may receive one or more SSBs (and/or SS/PBCH blocks), and select an SSB satisfying a specific level of quality (e.g., a quality acquired from the RSRP or the like) and/or a specific (best) SSB exhibiting the best quality. According to various embodiments, the UE may transmit message #1 (the RACH preamble transmitted by the UE in the 4-step RACH procedure) on a RACH occasion associated/linked with the SSB.

According to various embodiments, the UE may measure/acquire the UE Rx-Tx time difference measurement for the selected SSB and message #1 transmitted on the RACH occasion. According to various embodiments, the BS/cell/TRP may calculate/acquire a gNB Rx-Tx time difference measurement for the SSB transmitted by the BS/cell/TRP and message #1 transmitted on a RACH occasion associated/linked therewith.

According to various embodiments, the BS may deliver the gNB Rx-Tx time difference measurement information by transmitting message #2 (RAR message) and/or message #4 to the UE. For example, the gNB Rx-Tx time difference measurement may be included in message #2 and/or message #4. According to various embodiments, in determining/configuring/acquiring a TA value, the UE may use the gNB Rx-Tx time difference measurement information.

B. Example B

According to various embodiments, a method of configuring and/or updating TA based on a gNB Rx-Tx time difference measurement between a reception time of message #1 and a transmission time of message #2 and/or a gNB Rx-Tx time difference measurement between a reception time of message #3 and a transmission time of message #4 may be considered.

Sub Number i)

According to various embodiments, the UE may measure/acquire a UE Rx-Tx time difference measurement from a transmission time of message #1 transmitted on a specific RACH occasion to a reception time of message #2.

According to various embodiments, the above-described operation of the UE may be indicated/configured by the BS/network. For example, the corresponding indication/configuration information may be included as part of system information and/or RRC signaling and transmitted to the UE.

According to various embodiments, the BS may calculate/acquire a gNB Rx-Tx time difference measurement from the reception time of message #1 to the transmission time of message #2, and may add the measurement to message #2 (RAR message) and transmit the same to the UE. According to various embodiments, the UE may receive message #2 and recognize the gNB Rx-Tx time difference measurement information. According to various embodiments, the provided gNB Rx-Tx time difference measurement information may be used to determine/configure/update the TA. As another example, the BS may not deliver the gNB Rx-Tx time difference measurement information through message #2, but may transmit the same in message #4 and/or deliver the same after the RACH procedure.

Sub Number ii)

According to various embodiments, the UE may measure/acquire a UE Rx-Tx time difference measurement from a transmission time of message #3 to a reception time of message #4. According to various embodiments, the BS/network may configure/indicate a measurement execution operation of the UE by signaling of message #2 (RAR message).

According to various embodiments, the BS may acquire/calculate a gNB Rx-Tx time difference measurement from a transmission time of message #2 to a time when message #3 is received from the UE. According to various embodiments, the BS may add the gNB Rx-Tx time difference measurement information to message #4 and transmit the same to the UE, and/or transmit the gNB Rx-Tx time difference measurement information after the RACH procedure.

For example, in the 4-step RACH procedure, the BS indicates a TA command to the UE through message #2, and accordingly the gNB Rx-Tx time difference measurement according to various embodiments may be easily applied in changing/updating a preconfigured/indicated TA value when transmitted to the UE through message #4 and/or subsequent signaling. However, applying various embodiments to the initial TA configuration is not excluded.

According to various embodiments, in the above-described TA determination/acquisition method for the UE, the network may deliver the gNB Rx-Tx time difference measurement to the UE through message 2/message 4/message B, etc., and the UE may determine/calculate RTT/TA based on the UE Rx-Tx time difference measurement that the UE has/has acquired. In this case:

For example, the UE may secure/acquire more accurate RTT/TA value than the network does, and the BS/network may acquire/acquire only a rough RTT/TA value (less than or equal to the accuracy of the RTT/TA value secured by the UE) based on measurement on a UL signal transmitted by the UE in a legay operation. Thus, for example, to allow the BS/network to secure/acquire a more accurate RTT/TA value, the UE may then additionally report a UE Rx-Tx time difference measurement and/or report an accurate RTT/TA value determined based on the gNB Rx-Tx time difference measurement (and/or UE Rx-Tx time difference measurement).

For example, the data payload that may be transmitted through the PUSCH of message #3 and/or message #A may be limited (compared to PDSCH). For example, when a UE delivers a UE Rx-Tx time difference measurement to a network, a measurement reporting overhead may be a burden. For example, measurement accuracy may not be guaranteed if low-level measurement quantization is used to reduce the reporting overhead. On the other hand, for example, when the gNB Rx-Tx time difference is transmitted from the BS, it is delivered through the PDSCH, which has a relatively large payload, and therefore a more accurate value may be transmitted.

For example, from the perspective of UE positioning, it may be important for the UE to have/acquire an accurate (high accuracy) TA value. For example, when a UL-TDOA and/or multi-RTT technique is used for UE positioning, a UL reference signal (RS) (e.g., SRS for positioning, SRS for multi input multi output (MIMO), a RACH signal (e.g., one or more of the signals/messages used in the random access procedure)) may be used. In this case, the transmission time of the UL signal (e.g., UL RS) of the UE may have a significant influence on the UE positioning accuracy. For example, when it is necessary to perform UE positioning at a sub-meter level, the TA of the UE may be very important to accurately perform UE positioning.

3) (Additional) Signaling for TA Configuration

According to various embodiments, when a TA value is configured/indicated for the UE, the BS/UE may not determine the TA only by the propagation time value between the BS and the UE. For example, the DL UL switching time of the BS may be considered, and/or the BS may change the DL transmission timing. In consideration of this point, one or more of the following various embodiments may be considered.

A. Embodiment A

According to various embodiments, the BS may signal additional information other than the gNB/eNB/BS/TRP Rx-Tx time difference measurement to the UE. For example, when the UE calculates/acquires a TA value, the UE may be instructed to add a specific time offset value in addition to the UE Rx-Tx time difference and the gNB Rx-Tx time difference.

B. Embodiment B

According to various embodiments, the BS may inform the UE of a gNB/eNB/BS/TRP Rx-Tx time difference measurement value reflecting a time offset required by the BS. According to various embodiments, the UE may calculate/acquire the RTT/TA based on the UE Rx-Tx time difference and the gNB/eNB/BS/TRP Rx-Tx time difference measurement value reflecting the time offset.

Proposal #2 [Operation Based on Transmission/Reception Time]

For example, there may be a case where the BS fails to properly receive message 1/message A/message 3 transmitted by the UE (e.g., the quality value related to message 1/message A/message 3 is less than or equal to a certain threshold). For example, the UE may need to transmit message 1/message A/message 3 repeatedly while increasing transmission power, and/or may need to transmit message 1/message A/message 3 multiple times. Accordingly, a reference for measurement/acquisition of the UE/gNB Rx-Tx time difference measurement may be needed.

According to various embodiments, a reference (e.g., a transmission/reception time) for for measurement/acquisition of the UE/gNB Rx-Tx time difference measurement may be provided. For example, one or more of the following various embodiments may be considered.

[SSB—Msg.1/A]

(UE perspective) According to various embodiments, for the UE Rx-Tx time difference measurement for an SSB and message #1 and/or message #A (RACH occasion) associated/linked with the SSB, the UE may measure/acquire the measurement, determining/considering the transmission time of message #1 (RACH occasion) transmitted immediately before receiving the RAR message (message 2) and/or message B as a UL Tx timing and the reception time of the SSB linked/associated with the RACH occasion as a DL Rx timing.

(BS perspective) According to various embodiments, for the gNB Rx-Tx time difference measurement, the BS may determine/consider (a reception time of) message #1 received (most recently) immediately before transmitting message #2 to the UE as a UL Rx timing, and determine/consider the time when an SSB associated/linked with the RACH occasion on which message #1 is transmitted is transmitted as a DL Tx timing. Additionally/alternatively, according to various embodiments, the reception time of message #A received (most recently) immediately before transmitting message #B to the UE may be determined/considered as a UL Rx timing, and the time when the SSB associated/linked with the time at which an RACH occasion on which the RACH preamble included in message #A is transmitted may be determined/considered as a DL Tx timing. Additionally/alternatively, according to various embodiments, when the fallback operation from 2-step RACH to 4-step RACH is supported, the reception time of message #1 received (most recently) immediately before transmitting message #B to the UE may be determined/considered as a UL Rx timing, and the time when the SSB associated/linked with the RACH occasion on which message #1 is transmitted may be determined/considered a DL Tx timing.

[Msg.2-Msg.3]

(UE perspective) According to various embodiments, the UE may measure/acquire a UE Rx-Tx time difference measurement for message #2 and/or message #3, considering/determining the transmission time of message #3 transmitted immediately before the UE receives message #4 as a UL Tx timing and the reception time of message #2 as a DL Rx timing.

(BS perspective) According to various embodiments, for the gNB Rx-Tx time difference measurement, the BS may measure/acquire the measurement, considering/determining the reception time of message #3 received (most recently) immediately before transmitting message #4 to the UE as a UL Rx timing and the transmission time of message #2 as a DL Tx timing.

Proposal #3

According to various embodiments, the UE may be configured/instructed by the network (e.g., BS/gNB/eNB/location server/LMF) to report a UE Rx-Tx time difference measurement for a specific DL RS resource (e.g., SS/PBCH block, CSI-RS resource, PRS resource, etc.) and a specific UL RS resource (e.g., SRS resource, etc.).

According to various embodiments, the network may inform the UE of a gNB Rx-Tx time difference measurement for a specific DL RS resource (e.g., SS/PBCH block, CSI-RS resource, PRS resource, etc.) and a specific UL RS resource (e.g., SRS resource, etc.). Additionally/alternatively, according to various embodiments, the UE may request gNB Rx-Tx time difference measurement information. For example, a signal (e.g., message 1, message 3, message A) used in the initial access procedure may be used, and/or a UL signal after the initial access procedure may be used.

Proposal #4 [UE RX-TX Time Difference Measurement for TA Configuration]

According to various embodiments, the UE may be configured/instructed by the BS to report a UE Rx-Tx time difference measurement for a specific cell/BS/TRP. According to various embodiments, the UE may be configured/instructed to report the "UE Rx-Tx time difference measurement" for the specific DL RS and/or DL RS resource configured by the BS/location server/LMF.

According to various embodiments, the UE may be configured/instructed by the BS/location server/LMF to report a UE Rx-Tx time difference measurement for a specific analog transmission/reception beam (e.g., a specific UL RS resource/antenna group/antenna panel/a set of antennas).

According to various embodiments, the UE may be configured/instructed to report a "UE Rx-Tx time difference measurement" for a specific DL RS resource (e.g., CSI-RS resource, SS/PBCH block, PRS resource, etc.). According to various embodiments, in consideration of a specific beam transmitted by the UE, the UE may be configured/instructed to report a "UE Rx-Tx time difference measurement" for a specific DL RS resource and/or a specific UL RS resource.

According to various embodiments, the UE may be configured/instructed to report a "UE Rx-Tx time difference measurement" and UL RS resource information used for the measurement (e.g., UL RS resource information used to acquire the UE Rx-Tx time difference measurement).

Figure 18:
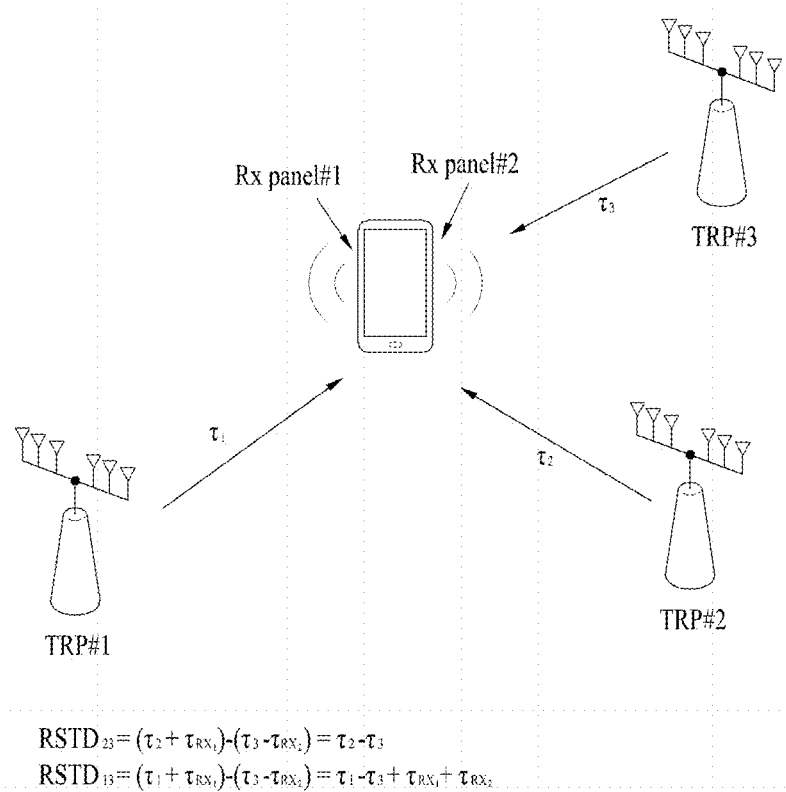
FIG. 18 is a diagram illustrating an example of a configuration of a reception antenna panel of a UE according to various embodiments.

FIG. 18 is a diagram illustrating an example of a configuration of a reception antenna panel of a UE according to various embodiments.

Referring to FIG. 18, for example, the UE may have two receive (Rx) panels. For example, each Rx panel may have additional timing delays/errors $\tau_{RX_1}$ and $\tau_{RX_2}$ other than the propagation time due to the implementation characteristics of the hardware (e.g., group delay, etc.). For example, in FIG. 18, it is illustrated that the UE acquires an RSTD measurement for TRP #1 and TRP #3 and an RSTD measurement for TRP #2 and TRP #3.

For example, when the UE measures/acquires an RSTD measurement for TRP #2 and TRP #3, the timing delays/errors of Rx panel #2 may offset each other due to use of Rx panel #2, and thus no error may occur in the RSTD measurement.

For example, when the UE measures/acquires an RSTD measurement for TRP #1 and TRP #3, Rx panel #1 and Rx panel #2 may be used for the TRPs. Accordingly, for example, a delay/error occurring in the Rx panel in the RSTD measurement may be included.

According to various embodiments, for example, when Rx panel #2 and TRP #3 of the UE are used as a reference configuration to acquire a reference timing to acquire RSTD measurement, the UE may measure/report the RSTD measurement between TRP #1 and/or TRP #3 using when Rx panel #2 used by the UE as the reference configuration.

A use of an antenna panel of a UE applicable to various embodiments will be described.

For example, a panel of the UE suitable for each cell/BS/TRP may vary according to the orientation/position of the UE and/or the orientation/position of the cell/BS/TRP. Accordingly, for example, a specific panel of the UE suitable for signal transmission/reception with a specific cell/BS/TRP may be selectively used at a specific time. Additionally/alternatively, for example, antenna panels of the UE suitable for cells/BSs/TRPs may be simultaneously used for simultaneous wireless communication of the different cells/BSs/TRPs.

For example, when there is only one panel of the UE at a specific position, the beam direction that may be formed on the panel of the UE may not be suitable for a cell/BS/TRP that needs to transmit and receive a radio signal. That is, for example, a decrease in data transfer rate and/or a decrease in measurement accuracy between the UE and the cell/BS/TRP may be caused.

Therefore, for example, it may be necessary to mount multiple antenna panels at various positions (e.g., corners/faces) of the UE such as a smartphone. However, for example, timing delay may vary due to different lengths cables connected between different antenna panels and the modem. Therefore, for example, it may be necessary to overcome/compensate for such delay characteristics in UE positioning.

For example, even with the same TRP, the "UE Rx-Tx time difference" measurement may vary among the antenna panels of the UE due to a "group delay" depending on the hardware characteristics of the antenna panels of the UE. Accordingly, for example, measurement/reporting for each panel may be necessary for accurate TA/RTT configuration.

In the description of various embodiments, a panel of the UE may be multiple antenna elements, and/or a group/set of antenna elements mounted on the UE. For example, the panel of the UE may be a specific physical panel/antenna group. For example, for the panel of the UE, a logical bundle of multiple antennas may be used as one group. In the description of various embodiments, the panel of the UE may be expressed as an "antenna group" or an "antenna element" in addition to the "panel". According to various embodiments, a method of separating/distinguishing an antenna group by grouping antenna elements and assigning a specific identifier/ID thereto may be introduced. According to various embodiments, a plurality of antenna elements may be distributed into one or more groups, and the one or more groups may be identified/distinguished from each other by the specific identifier/ID.

For example, antenna panel #1 (and/or antenna group #1, and/or an indication/configuration by which multiple antenna elements such as a specific UL RS resource/resource set (wherein the UL resource set includes one or more UL RS resources) may be referred to/designated as a group)) of the UE may be used for the BS/location server/LMF to configure/instruct the UE to report the UE Rx-Tx time difference measurement measured for the SSB (e.g., SSB #0, etc.).

For example, the propagation time/ToA measured by the UE may vary depending on the direction of the transmission/reception beam of the UE and/or the direction of the transmission/reception beam of the cell/BS/TRP. Therefore, for example, the UE Rx-Tx time difference measurement may need to be acquired/reported in consideration of a specific beam direction/panel/antenna group in which the UE transmits an UL signal.

According to various embodiments, the BS/location server/LMF may calculate/acquire a TA using UE Rx-Tx time difference measurement of the UE and/or the gNB/eNB Rx-Tx time difference measurement of the BS, and configure/indicate the TA for the UE based on the same.

Embodiment

Hereinafter, some specific examples of the various embodiments described above will be described. The details described in the above description of the various embodiments are omitted. For more details, reference may be made to the description of the various embodiments given above.

Figure 19:
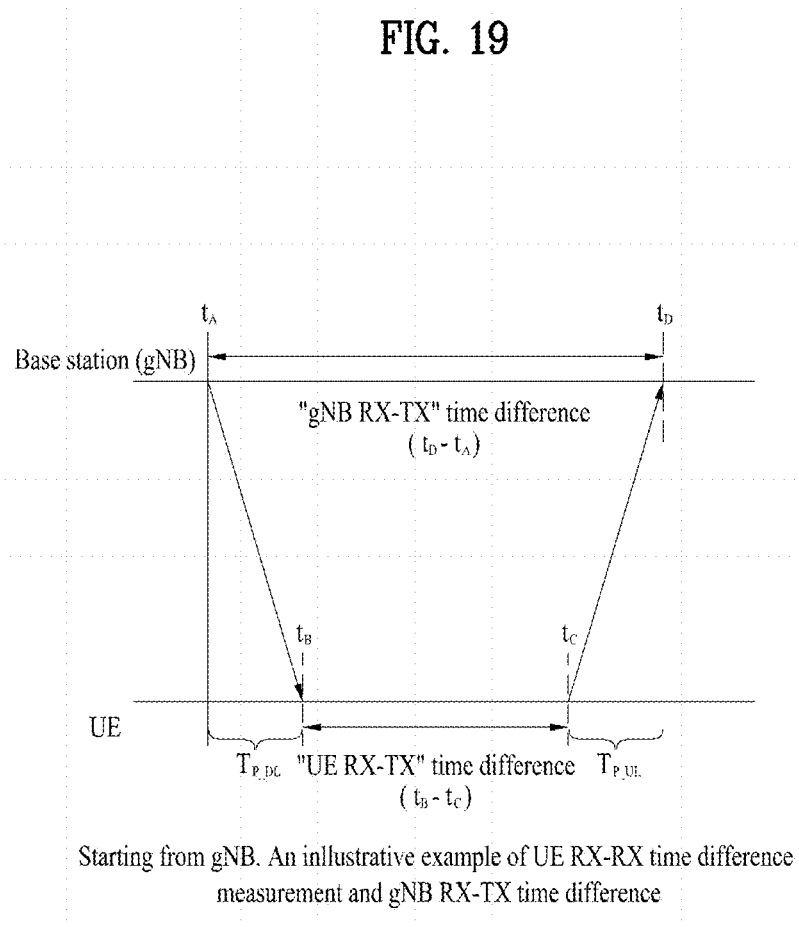
FIG. 19 is a diagram illustrating an example of an RTT/TA acquisition method according to various embodiments.

FIG. 19 is a diagram illustrating an example of an RTT/TA acquisition method according to various embodiments.

Referring to FIG. 19, signaling for measuring a UE Rx-Tx time difference and/or gNB Rx-Tx time difference for RTT/TA acquisition according to various embodiments may start from the BS.

According to various embodiments, a first signal may be transmitted by the BS at a transmission time $t_A$, and may be received by a UE at a reception time $t_B$. According to various embodiments, there may be a time difference $T_{p\_DL}$ between the reception time $t_B$ and the transmission time $t_A$ related to the first signal.

According to various embodiments, a second signal may be transmitted by the UE at a transmission time $t_C$ and may be received by the BS at a reception time $t_D$. According to various embodiments, there may be a time difference $T_{p\_UL}$ between the reception time $t_D$ and the transmission time $t_C$ related to the second signal.

According to various embodiments, a UE Rx-Tx time difference may be acquired as a time difference between the reception time $t_B$ related to the first signal and the transmission time $t_C$ related to the second signal, $t_B-t_C$.

According to various embodiments, a gNB Rx-Tx time difference may be acquired as a time difference between the transmission time $t_A$ related to the first signal and the reception time $t_D$ related to the second signal, $t_D-t_A$.

According to various embodiments, RTT may be calculated/acquired from the sum of the gNB Rx-Tx time difference and the UE Rx-Tx time difference. According to various embodiments, TA may be calculated/acquired as RTT/2.

For example, a time difference $T_{p\_DL}+T_{p\_UL}$ may be generated between the gNB Rx-Tx time difference and the UE Rx-Tx time difference. According to various embodiments, since RTT/TA is acquired in consideration of the time difference $T_{p\_DL}+T_{p\_UL}$, the accuracy of RTT/TA may be improved.

Figure 20:
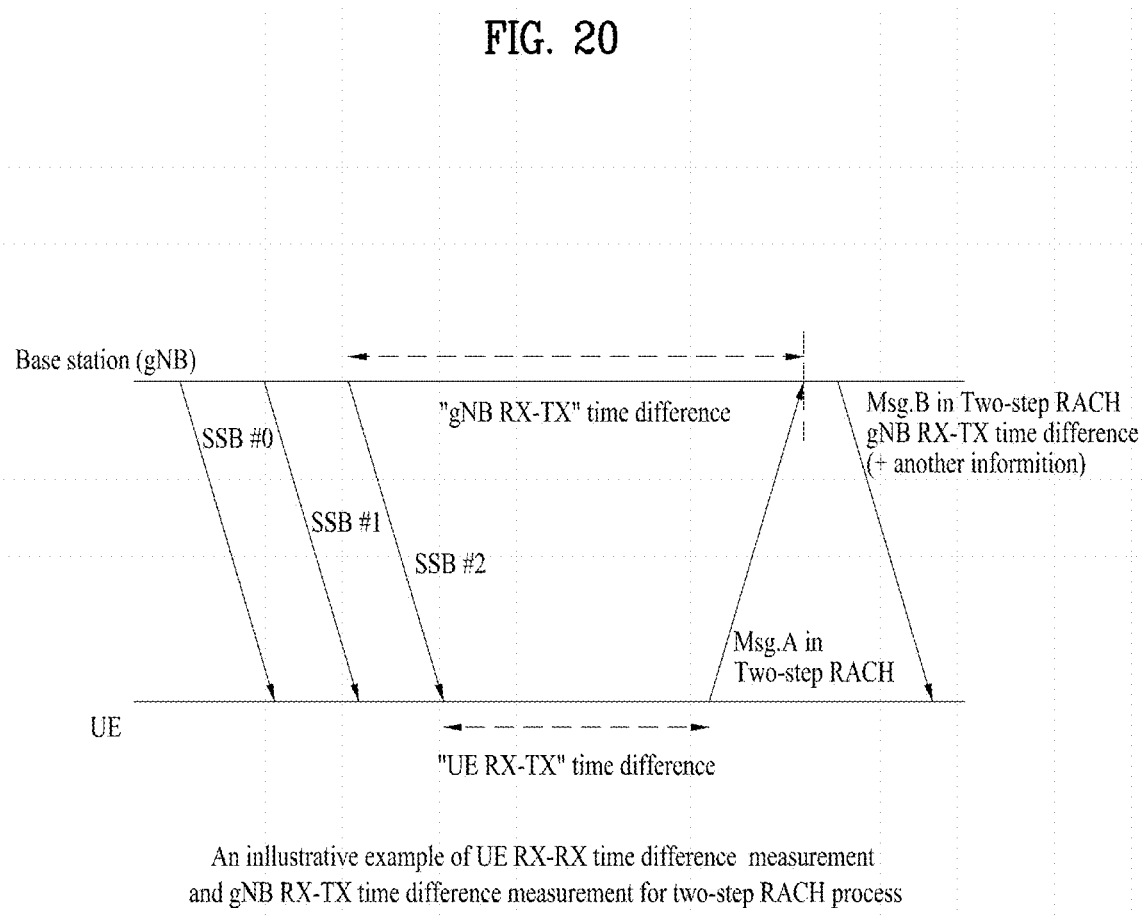
FIG. 20 is a diagram illustrating an example of an RTT/TA acquisition method according to various embodiments.

FIG. 20 is a diagram illustrating an example of an RTT/TA acquisition method according to various embodiments. More specifically, FIG. 20 is a diagram illustrating an example of an RTT/TA acquisition method in the two-step RACH procedure according to various embodiments.

Referring to FIG. 20, according to various embodiments, the BS may broadcast/transmit one or more SSBs (e.g., SSB #0, SSB #1, and SSB #2).

According to various embodiments, the UE may transmit message A including transmission of a PRACH preamble on a RACH occasion linked/associated with the best SSB (e.g., SSB #2) among the one or more SSBs.

According to various embodiments, a gNB Rx-Tx time difference may be acquired as a difference between a time when message A is received from the BS and a time when an SSB (e.g., SSB #2) associated/linked with message A (a RACH occasion on which the PRACH preamble is transmitted as included in message A) starts to be transmitted from the BS.

According to various embodiments, a UE Rx-Tx time difference may be acquired as a difference between a time of transmission of message A from the UE and a time when an SSB (e.g., SSB #2) associated/linked with message A (a RACH occasion on which the PRACH preamble is transmitted as included in message A) starts to be received from the UE According to various embodiments, the gNB Rx-Tx time difference and/or other information for the UE to acquire RTT/TA may be transmitted from the BS to the UE through message B.

According to various embodiments, the RTT may be calculated/acquired from the sum of the gNB Rx-Tx time difference and the UE Rx-Tx time difference. According to various embodiments, TA may be calculated/acquired as RTT/2.

Figure 21:
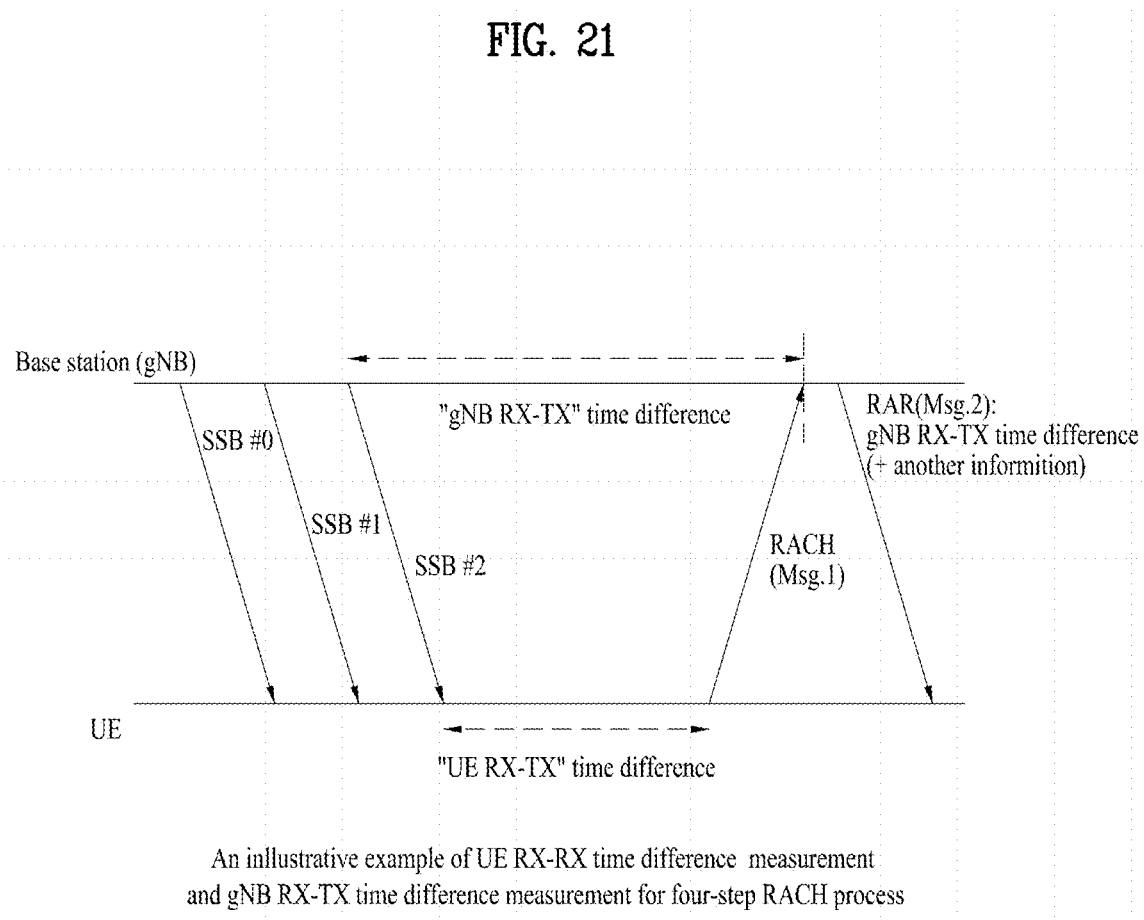
FIG. 21 is a diagram illustrating an example of an RTT/TA acquisition method according to various embodiments.

FIG. 21 is a diagram illustrating an example of an RTT/TA acquisition method according to various embodiments. More specifically, FIG. 21 is a diagram illustrating an example of an RTT/TA acquisition method in the 4-step RACH procedure according to various embodiments.

Referring to FIG. 21, according to various embodiments, the BS may broadcast/transmit one or more SSBs (e.g., SSB #0, SSB #1, and SSB #2).

According to various embodiments, the UE may transmit a PRACH preamble (RACH, message 1) on a RACH occasion linked/associated with the best SSB (e.g., SSB #2) among the one or more SSBs.

According to various embodiments, a gNB Rx-Tx time difference may be acquired as a difference between a time when message 1 is received from the BS and a time when the SSB (e.g., SSB #2) linked/associated with message 1 (a RACH occasion on which message 1 is transmitted) starts to be transmitted from the BS.

According to various embodiments, a UE Rx-Tx time difference may be acquired as a difference between a time of transmission of message 1 from the UE and a time when the SSB (e.g., SSB #2) linked/associated with message 1 (the RACH occasion on which message 1 is transmitted) starts to be received from the UE.

According to various embodiments, the gNB Rx-Tx time difference and/or other information used for the UE to acquire RTT/TA may be transmitted from the BS to the UE through message 2 (and/or message 4).

According to various embodiments, the RTT may be calculated/acquired from the sum of the gNB Rx-Tx time difference and the UE Rx-Tx time difference. According to various embodiments, TA may be calculated/acquired as RTT/2.

Figure 22:
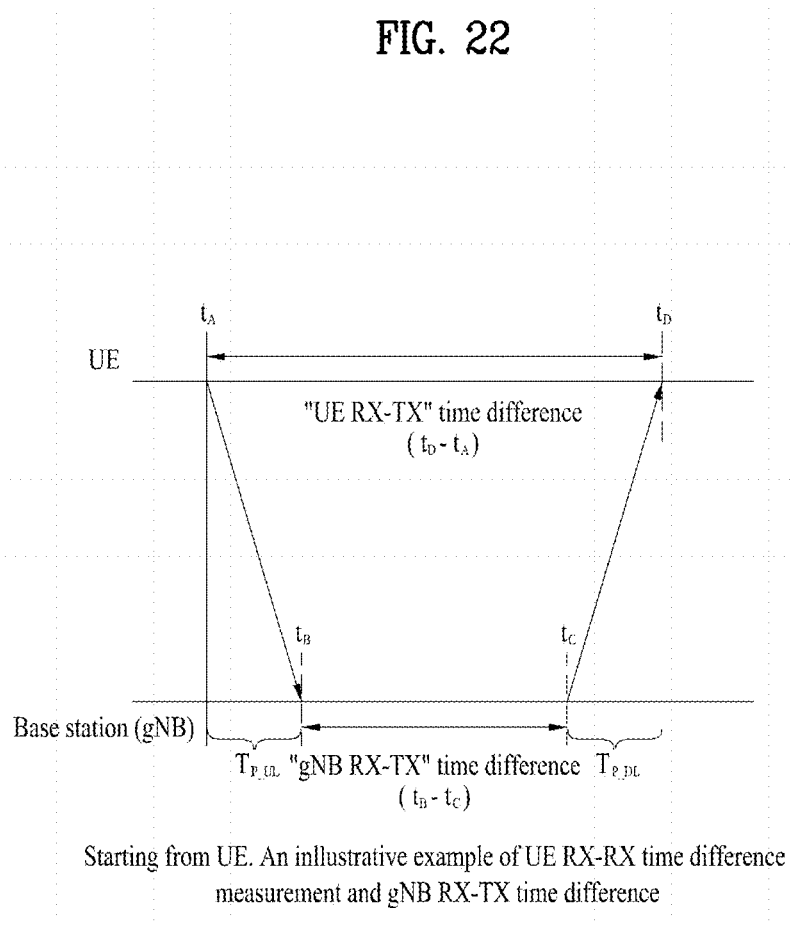
FIG. 22 is a diagram illustrating an example of an RTT/TA acquisition method according to various embodiments.

FIG. 22 is a diagram illustrating an example of an RTT/TA acquisition method according to various embodiments.

Referring to FIG. 22, signaling for measuring a UE Rx-Tx time difference and/or gNB Rx-Tx time difference for RTT/TA acquisition according to various embodiments may start from the UE.

According to various embodiments, a first signal may be transmitted by the UE at a transmission time $t_A$, and may be received by a UE at a reception time $t_B$. According to various embodiments, there may be a time difference $T_{p\_UL}$ between the reception time $t_B$ and the transmission time $t_A$ related to the first signal.

According to various embodiments, a second signal may be transmitted by the BS at a transmission time $t_C$ and may be received by the UE at a reception time $t_D$. According to various embodiments, there may be a time difference $T_{p\_DL}$ between the reception time $t_D$ and the transmission time $t_C$ related to the second signal.

According to various embodiments, a UE Rx-Tx time difference may be acquired as a time difference between the transmission time $t_A$ related to the first signal and the reception time $t_C$, related to the second signal, $t_D$–$t_A$.

According to various embodiments, a gNB Rx-Tx time difference may be acquired as a time difference between the reception time $t_B$ related to the first signal and the transmission time $t_C$ related to the second signal, $t_B$–$t_C$.

According to various embodiments, RTT may be calculated/acquired from the sum of the UE Rx-Tx time difference and the gNB Rx-Tx time difference. According to various embodiments, TA may be calculated/acquired as RTT/2.

For example, a time difference $T_{p\_DL}+T_{p\_UL}$ may be generated between the UE Rx-Tx time difference and the gNB Rx-Tx time difference. According to various embodiments, since RTT/TA is acquired in consideration of the time difference $T_{p\_DL}+T_{p\_UL}$, the accuracy of RTT/TA may be improved.

Figure 23:
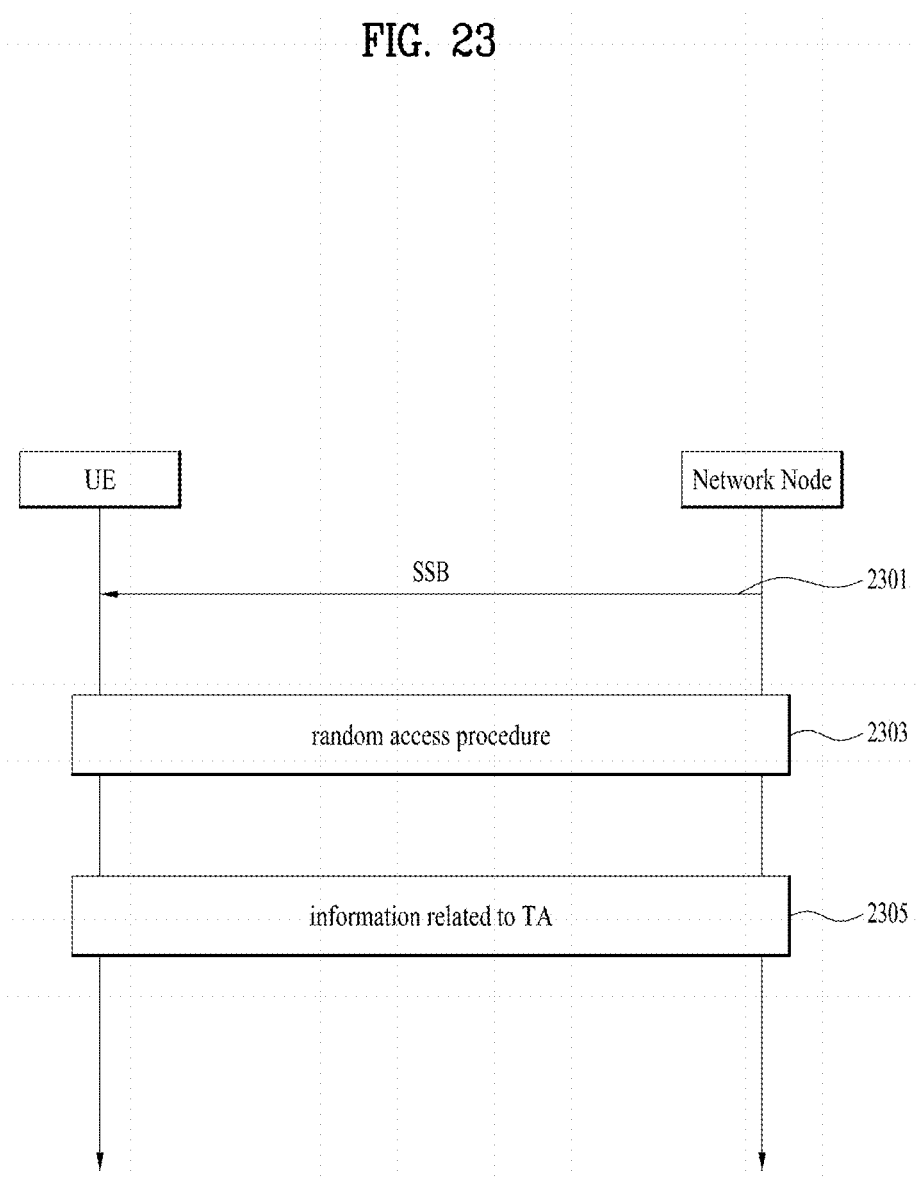
FIG. 23 is a diagram schematically illustrating a method of operating a UE and a network node according to various embodiments.

FIG. 23 is a diagram schematically illustrating a method of operating a UE and network nodes according to various embodiments.

Figure 24:
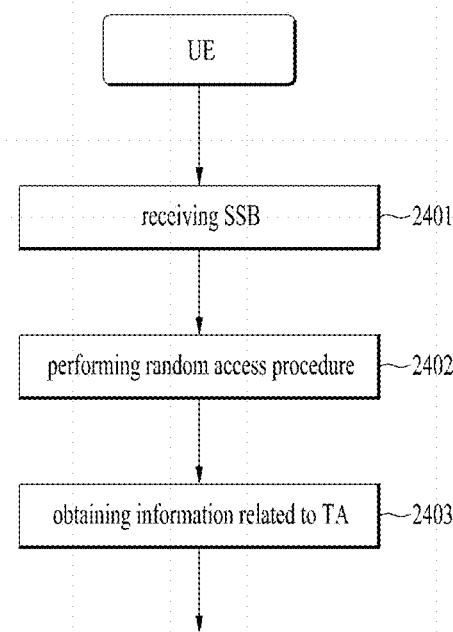
FIG. 24 is a flowchart illustrating a method of operating a UE according to various embodiments.
Figure 25:
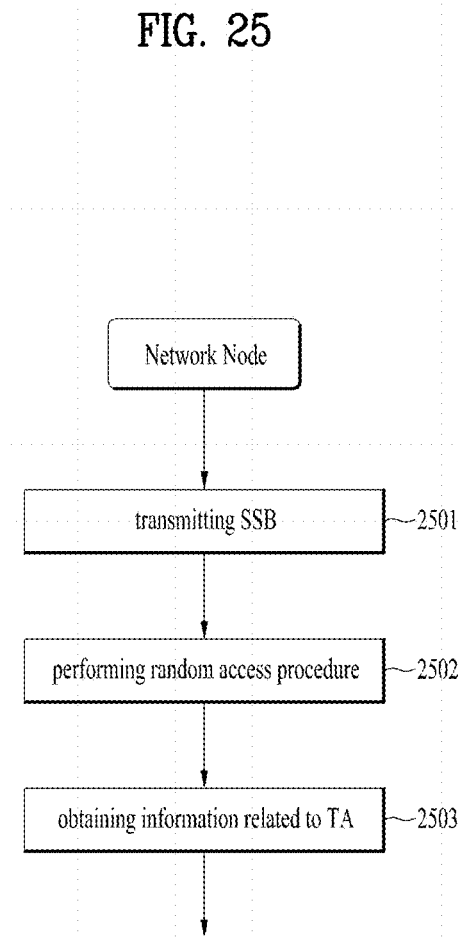
FIG. 25 is a flowchart illustrating a method of operating a network node according to various embodiments.

FIG. 24 is a flowchart illustrating a method of operating a UE according to various embodiments FIG. 25 is a flowchart illustrating a method of operating a network node according to various embodiments. For example, the network node may be a TP, and/or a BS, and/or a cell, and/or a location server, and/or an LMF, and/or any device that performs the same operation.

Referring to FIGS. 23 to 25, in operations 2301, 2401, and 2501 according to various embodiments, the network node may transmit/broadcast a synchronization signal block (SSB), and the UE may receive the same.

In operations 2303, 2403, and 2503 according to various embodiments, the UE and/or the network node may perform a random access procedure.

In operations 2305, 2405, and 2505 in accordance with various embodiments, the UE and/or the network node may acquire information related to timing advance (TA).

According to various embodiments, the random access procedure may include: transmission and reception of a first message including a physical random access channel (PRACH) preamble based on an SSB; and transmission and reception of a second message including information related to a random access response (RAR) after the transmission and reception of the first message.

According to various embodiments, the TA may be acquired based on a sum of: (i) a difference between a reception time of the SSB at the UE and a transmission time of the first message at the UE, and (ii) a difference between a transmission time of the SSB at the network node and a reception time of the first message at the network node.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments

4.1. Exemplary Configurations of Devices to which Various Embodiments are Applied FIG. 26 is a diagram illustrating a device that implements various embodiments.

The device illustrated in FIG. 17 may be a UE and/or a BS (e.g., eNB or gNB or TP) and/or a location server (or LMF) which is adapted to perform the above-described mechanism, or any device performing the same operation.

Figure 26:
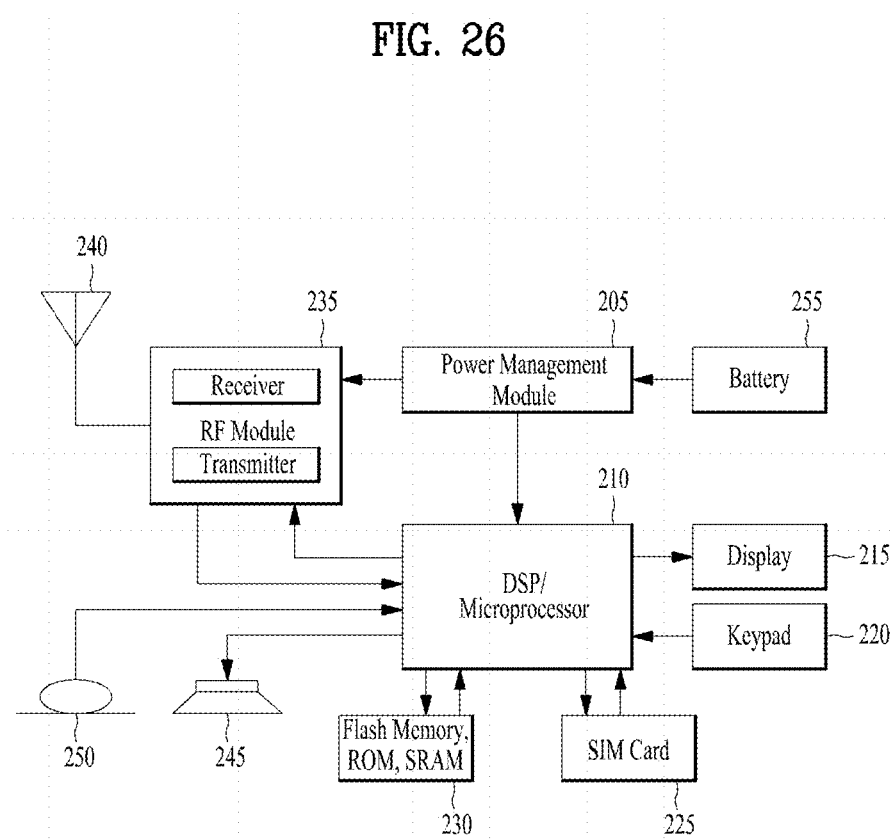
FIG. 26 is a block diagram illustrating an apparatus for implementing various embodiments of the present disclosure.

Referring to FIG. 26, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 26 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 26 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, one or more processors included in the UE (or one or more processors of a communication device included in the UE) may receive a synchronization signal block (SSB) from the network node.

According to various embodiments, the one or more processors included in the UE may perform a random access procedure.

According to various embodiments, one or more processors included in the UE may acquire information related to timing advance (TA).

According to various embodiments, the random access procedure may include: transmitting a first message including a physical random access channel (PRACH) preamble based on the SSB; and receiving a second message including information related to a random access response (RAR) after transmitting the first message.

According to various embodiments, the TA may be acquired based on a sum of (i) a difference between a reception time of the SSB at the UE and a transmission time of the first message at the UE, and (ii) a difference between a transmission time of the SSB at the network node and a reception time of the first message at the network node.

According to various embodiments, one or more processors included in the network node (or one or more processors of a communication device included in the network node) may transmit a synchronization signal block (SSB).

According to various embodiments, the one or more processors included in the network node may perform a random access procedure.

According to various embodiments, the one or more processors included in the network node may acquire information related to timing advance (TA).

According to various embodiments, the random access procedure may include receiving, from a UE, a first message including a physical random access channel (PRACH) preamble after transmitting the SSB, and transmitting, to the UE, a second message including information related to a random access response (RAR) after receiving the first message.

According to various embodiments, the TA may be acquired based on a sum of (i) a difference between a reception time of the SSB at the UE and a transmission time of the first message at the UE, and (ii) a difference between a transmission time of the SSB at the device and a reception time of the first message at the device.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 27:
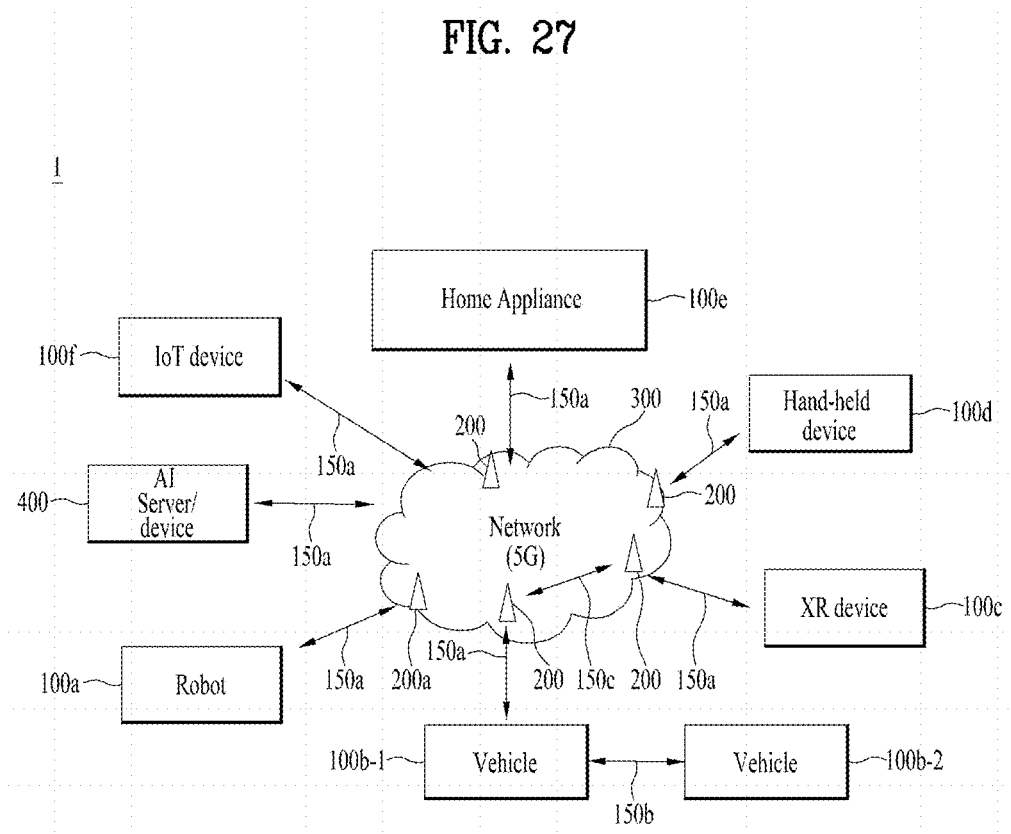
FIG. 27 is a diagram illustrating a communication system to which various embodiments of the present disclosure are applicable.

FIG. 27 illustrates an exemplary communication system to which various embodiments of the present disclosure are applied.

Referring to FIG. 27, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 28:
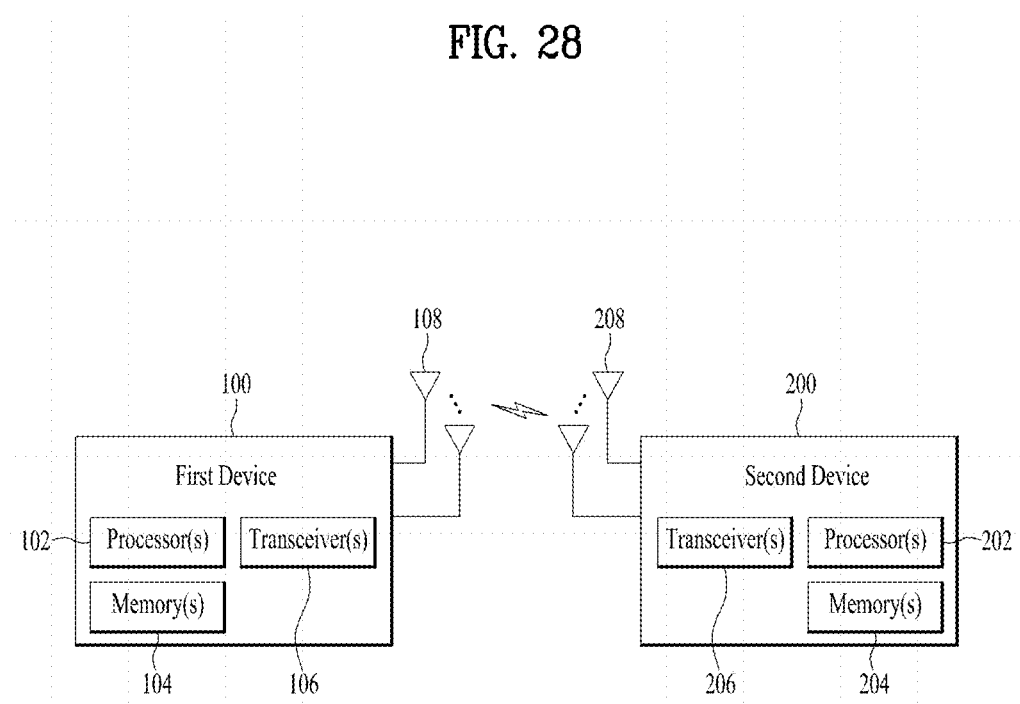
FIG. 28 is a block diagram illustrating wireless devices to which various embodiments of the present disclosure are applicable.

4.2.1 Example of Wireless Devices to which Various Embodiments of the Present Disclosure are Applied FIG. 28 illustrates exemplary wireless devices to which various embodiments of the present disclosure are applicable.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 29:
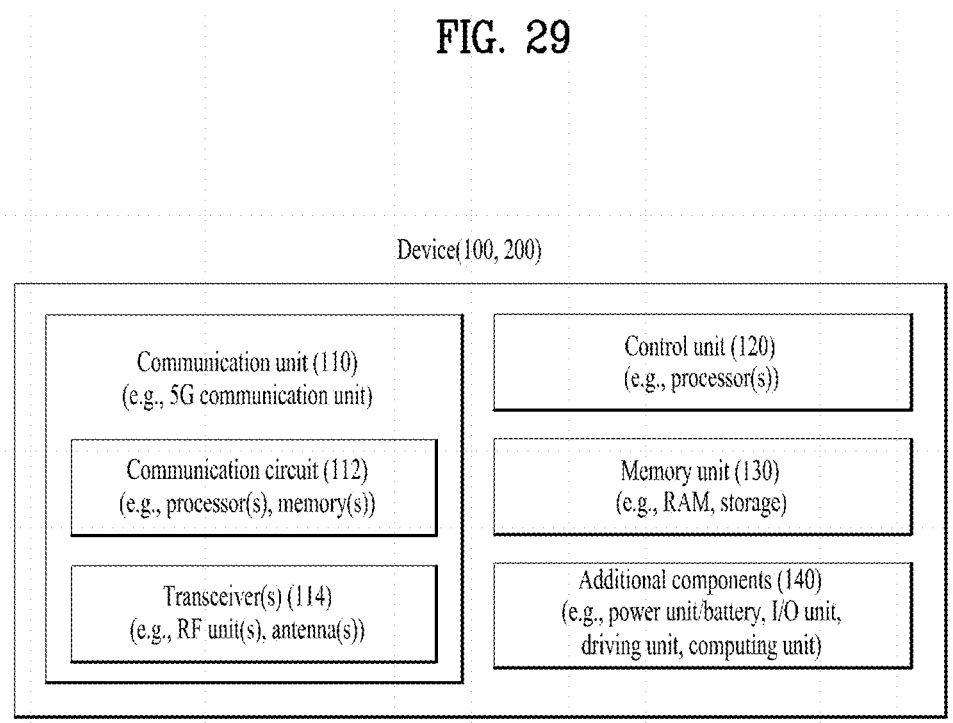
FIG. 29 is a block diagram illustrating another example of wireless devices to which various embodiments of the present disclosure are applicable.

4.2.2. Example of Using Wireless Devices to which Various Embodiments of the Present Disclosure are Applied FIG. 29 illustrates other exemplary wireless devices to which various embodiments of the present disclosure are applied. The wireless devices may be implemented in various forms according to a use case/service (see FIG. 27).

Referring to FIG. 29, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 29 will be described in detail with reference to the drawings.

4.2.3. Example of Portable Device to which Various Embodiments of the Present Disclosure are Applied FIG. 30 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 30, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure FIG. 31 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 31, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by an apparatus, the method comprising:
  receiving a synchronization signal block (SSB) from a base station;
  performing a random access procedure; and
  obtaining information related to timing advance (TA),
  wherein the random access procedure comprises:
  transmitting a first message including a physical random access channel (PRACH) preamble based on the SSB; and
  receiving a second message including information related to a random access response (RAR) after transmitting the first message,
  wherein the TA is obtained based on a sum of:
  (i) a difference between a reception time of the SSB at the apparatus and a transmission time of the first message at the apparatus; and
  (ii) a difference between a transmission time of the SSB at the base station and a reception time of the first message at the base station,
  wherein the second message further includes information related to a timing offset and information related to a timing offset,
  wherein the timing offset is related to a downlink (DL) uplink (UL) switching time of the base station, and
  wherein the TA is obtained based on:
  the timing offset being applied to the sum of (i) the difference between the reception time of the SSB at the apparatus and the transmission time of the first message at the apparatus, and (ii) the difference between the transmission time of the SSB at the base station and the reception time of the first message at the base station.

2. The method of claim 1, further comprising:
  receiving information for configuring the TA to be obtained based on the sum of (i) the difference between the reception time of the SSB at the apparatus and the transmission time of the first message at the apparatus, and (ii) the difference between the transmission time of the SSB at the base station and the reception time of the first message at the base station.

3. The method of claim 1, wherein the second message further includes:
  information related to the difference between the transmission time of the SSB at the base station and the reception time of the first message at the base station.

4. The method of claim 1, further comprising:
  reporting the TA based on receiving information for configuring the TA to be reported.

5. The method of claim 1, wherein the apparatus comprises a plurality of antenna elements,
  the method further comprising:
  based on receiving information for configuring a measurement related to one or more antenna elements among the plurality of antenna elements to be reported, reporting information relating to a difference between a reception time of a downlink (DL) reference signal (RS) related to the one or more antenna elements at the apparatus and the transmission time of the first message at the apparatus, wherein the DL RS includes one or more of the SSB, a positioning reference signal (PRS), or a channel state information reference signal (CSI-RS).

6. The method of claim 1, wherein the random access procedure further comprises:
transmitting a third message including a physical uplink shared channel (PUSCH) based on scheduling information included in the RAR,
wherein the TA is obtained based on a sum of:
(i) a difference between a reception time of the second message at the apparatus and a transmission time of the third message at the apparatus; and
(ii) a difference between a transmission time of the second message at the base station and a reception time of the third message at the base station.

7. A apparatus comprising:
at least one processor; and
at least one memory storing instructions that cause the at least one processor to perform operations comprising:
receiving a synchronization signal block (SSB) from a base station;
performing a random access procedure; and
obtaining information related to timing advance (TA),
wherein the random access procedure comprises:
transmitting a first message including a physical random access channel (PRACH) preamble based on the SSB; and
receiving a second message including information related to a random access response (RAR) after transmitting the first message,
wherein the TA is obtained based on a sum of:
(i) a difference between a reception time of the SSB at the apparatus and a transmission time of the first message at the apparatus; and
(ii) a difference between a transmission time of the SSB at the base station and a reception time of the first message at the base station,
wherein the second message further includes information related to a timing offset and information related to a timing offset,
wherein the timing offset is related to a downlink (DL) uplink (UL) switching time of the base station, and
wherein the TA is obtained based on:
the timing offset being applied to the sum of (i) the difference between the reception time of the SSB at the apparatus and the transmission time of the first message at the apparatus, and (ii) the difference between the transmission time of the SSB at the base station and the reception time of the first message at the base station.

8. The apparatus of claim 7, wherein the one or more processors are configured to:
receive information for configuring the TA to be obtained based on the sum of (i) the difference between the reception time of the SSB at the apparatus and the transmission time of the first message at the apparatus, and (ii) the difference between the transmission time of the SSB at the base station and the reception time of the first message at the base station.

9. The apparatus of claim 7, wherein the second message further includes:
information related to the difference between the transmission time of the SSB at the base station and the reception time of the first message at the base station.

10. The apparatus of claim 7, wherein the apparatus is configured to communicate with one or more of a mobile terminal, a network, and an autonomous vehicle other than a vehicle containing the apparatus.

11. A method performed by an apparatus, the method comprising:
transmitting a synchronization signal block (SSB);
performing a random access procedure; and
obtaining information related to timing advance (TA),
wherein the random access procedure comprises:
transmitting the SSB and receiving a first message including a physical random access channel (PRACH) preamble from a terminal; and
transmitting a second message including information related to a random access response (RAR) to the terminal after receiving the first message,
wherein the TA is obtained based on a sum of:
(i) a difference between a reception time of the SSB at the terminal and a transmission time of the first message at the terminal; and
(ii) a difference between a transmission time of the SSB at the apparatus and a reception time of the first message at the apparatus,
wherein the second message further includes information related to a timing offset and information related to a timing offset,
wherein the timing offset is related to a downlink (DL) uplink (UL) switching time of the base station, and
wherein the TA is obtained based on:
the timing offset being applied to the sum of (i) the difference between the reception time of the SSB at the terminal and the transmission time of the first message at the terminal, and (ii) the difference between the transmission time of the SSB at the apparatus and the reception time of the first message at the apparatus.

12. A apparatus operating in a wireless communication system, comprising:
at least one processor;
a memory storing instructions that cause the at least one processor to perform operations comprising:
transmitting a synchronization signal block (SSB);
performing a random access procedure; and
obtaining information related to timing advance (TA),
wherein the random access procedure comprises:
transmitting the SSB and receiving a first message including a physical random access channel (PRACH) preamble from a terminal; and
transmitting a second message including information related to a random access response (RAR) to the terminal after receiving the first message,
wherein the TA is obtained based on a sum of:
(i) a difference between a reception time of the SSB at the terminal and a transmission time of the first message at the terminal; and
(ii) a difference between a transmission time of the SSB at the apparatus and a reception time of the first message at the apparatus,
wherein the second message further includes information related to a timing offset and information related to a timing offset,
wherein the timing offset is related to a downlink (DL) uplink (UL) switching time of the base station, and
wherein the TA is obtained based on:
the timing offset being applied to the sum of (i) the difference between the reception time of the SSB at the terminal and the transmission time of the first message at the terminal, and (ii) the difference between the transmission time of the SSB at the apparatus and the reception time of the first message at the apparatus.

* * * * *